(12) United States Patent
Yu et al.

(10) Patent No.: US 12,477,401 B1
(45) Date of Patent: Nov. 18, 2025

(54) COMMUNICATION METHOD AND APPARATUS

(71) Applicant: Huawei Technologies Co., Ltd., Shenzhen (CN)

(72) Inventors: Youyang Yu, Shanghai (CN); Shufeng Shi, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 449 days.

(21) Appl. No.: 17/964,544

(22) Filed: Oct. 12, 2022

Related U.S. Application Data

(63) Continuation of application No. PCT/CN2021/073720, filed on Jan. 26, 2021.

(30) Foreign Application Priority Data

Apr. 13, 2020 (CN) .......................... 202010284850.4

(51) Int. Cl.
  *H04W 76/11* (2018.01)
  *H04W 28/08* (2023.01)
  *H04W 28/12* (2009.01)

(52) U.S. Cl.
  CPC ....... *H04W 28/0992* (2020.05); *H04W 28/12* (2013.01)

(58) Field of Classification Search
  CPC . H04W 28/0268; H04W 28/08; H04W 76/11; H04W 76/12; H04L 47/125
  USPC .......................................................... 370/329
  See application file for complete search history.

(56) References Cited

U.S. PATENT DOCUMENTS

| | | | |
|---|---|---|---|
| 12,200,595 B2 * | 1/2025 | Youn ..................... | H04W 40/12 |
| 2012/0307658 A1 | 12/2012 | Xia et al. | |
| 2015/0113160 A1 | 4/2015 | Sun | |
| 2016/0183125 A1 | 6/2016 | Sun et al. | |
| 2016/0198364 A1 | 7/2016 | Schwarzbauer et al. | |
| 2018/0027451 A1 | 1/2018 | Sun et al. | |
| 2019/0254057 A1 | 8/2019 | Hampel et al. | |
| 2019/0306068 A1 | 10/2019 | Kiss et al. | |
| 2020/0084631 A1 * | 3/2020 | Zhang ................. | H04W 12/106 |
| 2020/0367110 A1 * | 11/2020 | Sun ....................... | H04W 24/08 |

(Continued)

FOREIGN PATENT DOCUMENTS

| CN | 103188725 A | 7/2013 |
|---|---|---|
| CN | 103491578 A | 1/2014 |

(Continued)

OTHER PUBLICATIONS

ZTE Wistron, "Rapporteur proposed conclusions and way forward for ATSSS," SA WG2 Meeting #129BIS, Nov. 25-30, 2018, West Palm Beach, Florida, S2-1811757, 5 pages.

(Continued)

*Primary Examiner* — Robert J Lopata
(74) *Attorney, Agent, or Firm* — Conley Rose, P.C.

(57) ABSTRACT

A communication method includes a first device that receives first indication information and a service flow identifier of a protocol data unit (PDU) session from a session management network element, where the first indication information indicates the first device to determine a transmission link for a service flow of the PDU session. The first device selects the transmission link for the service flow of the PDU session based on the service flow identifier and the first indication information.

20 Claims, 8 Drawing Sheets

(56) References Cited

U.S. PATENT DOCUMENTS

| | | | |
|---|---|---|---|
| 2021/0076238 A1* | 3/2021 | Zhou | H04W 28/0268 |
| 2021/0120620 A1* | 4/2021 | Wang | H04W 8/08 |
| 2021/0168079 A1 | 6/2021 | Yu | |
| 2021/0168905 A1 | 6/2021 | Yu | |
| 2022/0248479 A1* | 8/2022 | Yu | H04W 76/20 |
| 2022/0329535 A1* | 10/2022 | Li | H04L 45/22 |
| 2022/0377819 A1* | 11/2022 | Zhou | H04W 76/11 |
| 2022/0417825 A1* | 12/2022 | Youn | H04W 40/12 |
| 2023/0070345 A1* | 3/2023 | Xu | H04W 28/0865 |
| 2023/0155943 A1 | 5/2023 | Yu | |
| 2023/0354085 A1* | 11/2023 | Deng | H04W 76/11 |

FOREIGN PATENT DOCUMENTS

| | | |
|---|---|---|
| CN | 110519786 A | 11/2019 |
| CN | 110830429 A | 2/2020 |
| CN | 110831070 A | 2/2020 |
| WO | 2016161937 A1 | 10/2016 |
| WO | 2019033269 A1 | 2/2019 |
| WO | 2019196788 A1 | 10/2019 |
| WO | 2020034844 A1 | 2/2020 |
| WO | 2020034869 A1 | 2/2020 |

OTHER PUBLICATIONS

3GPP TR 23.793 V0.5.0, 3rd Generation Partnership Project; Technical Specification Group Services and System Aspects; Study on Access Traffic Steering, Switching and Splitting support in the 5G system architecture (Release 16), Technical Report, Jun. 2018, 68 pages.

3GPP TS 23.501 V16.4.0, Mar. 2020, 3rd Generation Partnership Project; Technical Specification Group Services and System Aspects; System architecture for the 5G System (5GS); Stage 2 (Release 16), 430 pages.

3GPP TS 23.502 V16.4.0, Mar. 2020, 3rd Generation Partnership Project; Technical Specification Group Services and System Aspects; Procedures for the 5G System (5GS); Stage 2 (Release 16), 582 pages.

Huawei et al., "Support of MA-PDU session", 3GPP TSG-SA WG2 Meeting #130, S2-1900463, Jan. 21-25, 2019, Kochi, India, 14 pages.

Sandvine et al., "New key issue: Adding Application KPIs to the Input data in some services described in TS23.288", SA WG2 Meeting #136 S2-1912301, Nov. 17-22, 2019, Reno NV, 3 pages.

* cited by examiner

COMMUNICATION METHOD AND APPARATUS

CROSS-REFERENCE TO RELATED APPLICATIONS

This is a continuation of International Patent Application No. PCT/CN2021/073720 filed on Jan. 26, 2021, which claims priority to Chinese Patent Application No. 202010284850.4 filed on Apr. 13, 2020. The disclosures of the aforementioned applications are hereby incorporated by reference in their entireties.

TECHNICAL FIELD

This disclosure relates to communication technologies, and in particular, to a communication method and apparatus.

BACKGROUND

In a next-generation wireless communication system, for example, in a New Radio (NR) system, user equipment (UE) establishes a protocol data unit (PDU) session to a data network (DN) network element through a user plane function (UPF) network element, and the PDU session provides a data transmission service between the terminal device and the DN network element.

In a current technology, establishment of a multi-access PDU session (or a multi-PDU session) between UE and a UPF network element may be supported. For example, as shown in FIG. 1, a multi-access PDU session A may be established between UE and a UPF network element based on an access technology 1 and an access technology 2. In this case, a service flow of the UE may be transmitted to the UPF network element by using the access technology 1 and/or the access technology 2. The multi-access PDU session is relative to a single-access PDU session. The single-access PDU session is a PDU session that accesses the UPF network element by using one access technology, and the multi-access PDU session is a PDU session that accesses the UPF network element by using a plurality of access technologies (at least two access technologies).

However, in the technology, a case in which a link selected for a service flow cannot meet a transmission requirement of the service flow often occurs.

SUMMARY

Embodiments of this disclosure provide a communication method and apparatus, so that a terminal device or a user plane network element can determine a transmission link for a service flow based on an actual status of the service flow, and this improves transmission efficiency.

According to a first aspect, an embodiment of this disclosure provides a communication method, including a first device that receives first indication information and a service flow identifier of a PDU session from a session management network element. The first indication information indicates the first device to determine a transmission link for a service flow of the PDU session. The first device selects the transmission link for the service flow of the PDU session based on the service flow identifier and the first indication information.

In this embodiment of this disclosure, the first device may be a terminal device or a user plane network element, and the terminal device or the user plane network element may autonomously determine the transmission link for the service flow, so that a transmission link that meets a current link status of the terminal device or the user plane network element can be selected for the service flow, and this implements efficient transmission of the service flow.

In a possible implementation, that the first device selects the transmission link for the service flow of the PDU session based on the service flow identifier and the first indication information includes that the first device identifies the service flow of the PDU session based on the service flow identifier. The first device selects, based on the first indication information, one or more transmission links for the service flow corresponding to the service flow identifier.

In a possible implementation, that the first device selects, based on the first indication information, one or more transmission links for the service flow corresponding to the service flow identifier includes that the first device selects, based on at least one of a user preference, an application preference, or a local policy, the one or more transmission links for the service flow corresponding to the service flow identifier. Alternatively, the first device selects, based on at least two of a link status, a transmission condition threshold, a service type, or an application type, the one or more transmission links for the service flow corresponding to the service flow identifier. Alternatively, the first device selects, based on a user preference and/or an application preference and/or a local policy, and a link status and/or a transmission condition threshold, the one or more transmission links for the service flow corresponding to the service flow identifier.

In a possible implementation, the first indication information is information indicating a first steering mode, and the first steering mode includes a steering mode in which the first device autonomously selects a transmission link for the service flow, a steering mode in which the first device selects, for the service flow, a transmission link that meets a transmission quality of service (QoS) requirement of the service flow, a steering mode in which the first device selects, for the service flow, a transmission link that meets a transmission bandwidth requirement of the service flow, a redundant transmission mode in which the first device selects two links for the service flow to simultaneously transmit the service flow, or a load-balancing steering mode in which the first device determines split percentages of two links for the service flow.

In a possible implementation, the first indication information is steering indication information, and the method further includes that the first device receives a second steering mode from the session management network element, where the second steering mode is one of the following: smallest delay steering mode, a load-balancing steering mode, a priority-based steering mode, or an active-standby steering mode. The steering indication information indicates the first device to select one or more other transmission links for the service flow of the PDU session when a link selected based on the second steering mode does not meet a transmission requirement of the service flow of the PDU session. Alternatively, the steering indication information indicates the first device to select the one or more transmission links for the service flow of the PDU session based on the second steering mode and the steering indication information.

In a possible implementation, when the second steering mode received by the first device is the load-balancing steering mode, the steering indication information is a specific split percentage of at least one link. The specific split percentage indicates the first device to determine the split percentage of the at least one transmission link.

In a possible implementation, the service flow identifier includes one or more of the following: a PDU session identifier or an N4 session identifier, service flow description information, an application identifier, a QoS flow identifier, a service type identifier, an application type identifier, or a terminal external identifier.

In a possible implementation, the first device is a terminal device, and the method further includes that the first device sends, to the session management network element, a message requesting to establish or update a PDU session.

In a possible implementation, the first device is a user plane network element.

According to a second aspect, an embodiment of this disclosure provides a communication method, including a session management network element that receives, from a terminal device, a message requesting to establish or update a PDU session. The session management network element obtains first indication information and a service flow identifier of the PDU session. The first indication information indicates the terminal device or a user plane network element to determine a transmission link for a service flow of the PDU session. The session management network element sends the service flow identifier and the first indication information to the terminal device, and/or the session management network element sends the service flow identifier and the first indication information to the user plane network element.

In a possible implementation, that the session management network element obtains a service flow identifier and first indication information includes the following.

The session management network element obtains the service flow identifier and second indication information from a policy control network element. The second indication information indicates the terminal device or the user plane network element to determine the transmission link for the service flow of the PDU session. The session management network element determines the first indication information based on the second indication information.

In a possible implementation, the session management network element determines the first indication information based on one or more of service flow feature information, third indication information, or a local policy, where the service flow feature information is obtained from the user plane network element, and the third indication information is obtained from the policy control network element. The third indication information indicates the session management network element to determine a second steering mode and/or the first indication information.

In a possible implementation, the service flow feature information includes one or more of the following: the service flow identifier, a service type, an application type, an application identifier, or a service flow transmission protocol.

For specific content of the first indication information in the second aspect, refer to the specific content in the first aspect. Details are not described herein again.

In a possible implementation, the session management network element sends the service flow identifier and fourth indication information to the user plane network element, where the fourth indication information indicates the user plane network element to report the service flow feature information of a service flow indicated by the service flow identifier.

According to a third aspect, an embodiment of this disclosure provides a communication method, including a policy control network element that obtains second indication information or third indication information, and a service flow identifier in a PDU session. The second indication information indicates a terminal device or a user plane network element to determine a transmission link for a service flow of the PDU session. The third indication information indicates a session management network element to determine the transmission link for the service flow of the PDU session. The policy control network element sends the service flow identifier and the second indication information or the third indication information to the session management network element.

In a possible implementation, that a policy control network element obtains second indication information or third indication information includes that the policy control network element obtains, from an application network element or a network element, service-related information of a service flow corresponding to the service flow identifier. The policy control network element determines the second indication information or the third indication information based on the service-related information.

In a possible implementation, the policy control network element determines the second indication information or the third indication information based on a local policy or subscription data.

In a possible implementation, the service-related information includes one or more of the following: access technology-related information, disorder-sensitive indication information, packet loss-sensitive indication information, delay-sensitive indication information, jitter-sensitive indication information, multi-access allowed indication information, or multi-access forbidden indication information.

According to a fourth aspect, an embodiment of this disclosure provides a communication apparatus. The communication apparatus may be a user plane network element, or may be a chip or a chip system in the user plane network element. The communication apparatus may include a processing unit and a communication unit. When the communication apparatus is the user plane network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the user plane network element implements the communication method according to any one of the first aspect or the possible implementations of the first aspect. When the communication apparatus is the chip or the chip system in the user plane network element, the processing unit may be a processor, and the communication unit may be a communication interface. For example, the communication interface may be an input/output interface, a pin, or a circuit. The processing unit executes instructions stored in a storage unit, so that the user plane network element implements the communication method according to any one of the first aspect or the possible implementations of the first aspect. The storage unit may be a storage unit (for example, a register or a cache) in the chip, or may be a storage unit (for example, a read-only memory (ROM) or a random-access memory (RAM)) that is in the user plane network element and that is outside the chip.

The communication apparatus may be a terminal device, or may be a chip or a chip system in the terminal device. The communication apparatus may include a processing unit and a communication unit. When the communication apparatus is the terminal device, the processing unit may be a processor, and the communication unit may be a communication interface, an interface circuit, or a transceiver. The communication apparatus may further include a storage unit, and the storage unit may be a memory. The storage unit is configured to store instructions, and the processing unit executes the instructions stored in the storage unit, so that the terminal device implements the communication method according to any one of the first aspect or the possible implementations of the first aspect. When the communication apparatus is the chip in the terminal device, the processing unit may be a processor, and the communication unit may be a communication interface, for example, an input/output interface, a pin, or a circuit. The processing unit executes instructions stored in a storage unit, so that the terminal device implements the communication method according to any one of the first aspect or the possible implementations of the first aspect. The storage unit may be a storage unit (for example, a register or a cache) in the chip, or may be a storage unit (for example, a ROM or a RAM) that is in the terminal device and that is outside the chip.

For example, the communication unit is configured to receive first indication information and a service flow identifier of a PDU session from a session management network element. The first indication information indicates the communication apparatus to determine a transmission link for a service flow of the PDU session. The processing unit is configured to select the transmission link for the service flow of the PDU session based on the service flow identifier and the first indication information.

In a possible implementation, the processing unit is further configured to identify the service flow of the PDU session based on the service flow identifier, and select, based on the first indication information, one or more transmission links for the service flow corresponding to the service flow identifier.

In a possible implementation, the processing unit is further configured to select, based on at least one of a user preference, an application preference, or a local policy, the one or more transmission links for the service flow corresponding to the service flow identifier, select, based on at least two of a link status, a transmission condition threshold, a service type, or an application type, the one or more transmission links for the service flow corresponding to the service flow identifier, or select, based on a user preference and/or an application preference and/or a local policy, and a link status and/or a transmission condition threshold, the one or more transmission links for the service flow corresponding to the service flow identifier.

For specific content of the first indication information and the service flow identifier in the fourth aspect, refer to the specific content in the first aspect. Details are not described herein again.

In a possible implementation, the communication apparatus is the terminal device, and the communication unit is further configured to send, to the session management network element, a message requesting to establish or update a PDU session.

According to a fifth aspect, an embodiment of this disclosure provides a communication apparatus. The communication apparatus may be a session management network element, or may be a chip or a chip system in the session management network element. The communication apparatus may include a processing unit and a communication unit. When the communication apparatus is the session management network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the session management network element implements the communication method according to any one of the second aspect or the possible implementations of the second aspect. When the communication apparatus is the chip or the chip system in the session management network element, the processing unit may be a processor, and the communication unit may be a communication interface. For example, the communication interface may be an input/output interface, a pin, or a circuit. The processing unit executes instructions stored in a storage unit, so that the session management network element implements the communication method according to any one of the second aspect or the possible implementations of the second aspect. The storage unit may be a storage unit (for example, a register or a cache) in the chip, or may be a storage unit (for example, a ROM or a RAM) that is in the session management network element and that is outside the chip.

For example, the communication unit is configured to receive, from a terminal device, a message requesting to establish or update a PDU session. The processing unit is configured to obtain first indication information and a service flow identifier of the PDU session. The first indication information indicates the terminal device or a user plane network element to determine a transmission link for a service flow of the PDU session. The communication unit is further configured to send the service flow identifier and the first indication information to the terminal device, and/or send the service flow identifier and the first indication information to the user plane network element.

In a possible implementation, the processing unit is configured to obtain the service flow identifier and second indication information from a policy control network element. The second indication information indicates the terminal device or the user plane network element to determine the transmission link for the service flow of the PDU session. The processing unit is configured to determine the first indication information based on the second indication information.

In a possible implementation, the processing unit is configured to determine the first indication information based on one or more of service flow feature information, third indication information, or a local policy, where the service flow feature information is obtained from the user plane network element, and the third indication information is obtained from the policy control network element. The third indication information indicates the session management network element to determine a second steering mode and/or the first indication information.

In a possible implementation, the service flow feature information includes one or more of the following: the service flow identifier, a service type, an application type, an application identifier, or a service flow transmission protocol.

For specific content of the first indication information in the fifth aspect, refer to the specific content in the first aspect. Details are not described herein again.

In a possible implementation, the communication unit is further configured to send the service flow identifier and fourth indication information to the user plane network element, where the fourth indication information indicates the user plane network element to report the service flow feature information for a service flow indicated by the service flow identifier.

According to a sixth aspect, an embodiment of this disclosure provides a communication apparatus. The communication apparatus may be a policy control network element, or may be a chip or a chip system in the policy control network element. The communication apparatus may include a processing unit and a communication unit. When the communication apparatus is the policy control network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the policy control network element implements the communication method according to any one of the third aspect or the possible implementations of the third aspect. When the communication apparatus is the chip or the chip system in the policy control network element, the processing unit may be a processor, and the communication unit may be a communication interface. For example, the communication interface may be an input/output interface, a pin, or a circuit. The processing unit executes instructions stored in a storage unit, so that the policy control network element implements the communication method according to any one of the third aspect or the possible implementations of the third aspect. The storage unit may be a storage unit (for example, a register or a cache) in the chip, or may be a storage unit (for example, a ROM or a RAM) that is in the policy control network element and that is outside the chip.

For example, the processing unit is configured to obtain second indication information or third indication information, and a service flow identifier of a PDU session. The second indication information indicates a terminal device or a user plane network element to determine a transmission link for a service flow of the PDU session. The third indication information indicates a session management network element to determine the transmission link for the service flow of the PDU session. The communication unit is configured to send the service flow identifier and the second indication information or the third indication information to the session management network element.

In a possible implementation, the processing unit is further configured to obtain, from an application network element or a network element, service-related information of a service flow corresponding to the service flow identifier. The processing unit determines the second indication information or the third indication information based on the service-related information.

In a possible implementation, the processing unit is further configured to determine the second indication information or the third indication information based on a local policy or subscription data.

In a possible implementation, the service-related information includes one or more of the following: access technology-related information, disorder-sensitive indication information, packet loss-sensitive indication information, delay-sensitive indication information, jitter-sensitive indication information, multi-access allowed indication information, or multi-access forbidden indication information.

According to a seventh aspect, an embodiment of this disclosure provides a computer-readable storage medium. The computer-readable storage medium stores a computer program or instructions. When the computer program or the instructions are run on a computer, the computer is enabled to perform the communication method according to any one of the first aspect or the possible implementations of the first aspect.

According to an eighth aspect, an embodiment of this disclosure provides a computer-readable storage medium. The computer-readable storage medium stores a computer program or instructions. When the computer program or the instructions are run on a computer, the computer is enabled to perform the communication method according to any one of the second aspect or the possible implementations of the second aspect.

According to a ninth aspect, an embodiment of this disclosure provides a computer-readable storage medium. The computer-readable storage medium stores a computer program or instructions. When the computer program or the instructions are run on a computer, the computer is enabled to perform the communication method according to any one of the third aspect or the possible implementations of the third aspect.

According to a tenth aspect, an embodiment of this disclosure provides a computer program product including instructions. When the instructions are run on a computer, the computer is enabled to perform the communication method according to any one of the first aspect or the possible implementations of the first aspect.

According to an eleventh aspect, an embodiment of this disclosure provides a computer program product including instructions. When the instructions are run on a computer, the computer is enabled to perform the communication method according to any one of the second aspect or the possible implementations of the second aspect.

According to a twelfth aspect, an embodiment of this disclosure provides a computer program product including instructions. When the instructions are run on a computer, the computer is enabled to perform the communication method according to any one of the third aspect or the possible implementations of the third aspect.

According to a thirteenth aspect, an embodiment of this disclosure provides a communication system. The communication system includes any one or both of the following: the communication apparatus according to any one of the fourth aspect and the possible implementations of the fourth aspect and the session management network element according to any one of the fifth aspect and the possible implementations of the fifth aspect.

In a possible implementation, the communication system may further include the policy control network element according to any one of the sixth aspect and the possible implementations of the sixth aspect.

According to a fourteenth aspect, an embodiment of this disclosure provides a communication apparatus. The communication apparatus includes a processor and a storage medium. The storage medium stores instructions. When the instructions are run by the processor, the processor implements the communication method according to any one of the first aspect or the possible implementations of the first aspect.

According to a fifteenth aspect, an embodiment of this disclosure provides a communication apparatus. The communication apparatus includes a processor and a storage medium. The storage medium stores instructions. When the instructions are run by the processor, the processor implements the communication method according to any one of the second aspect or the possible implementations of the second aspect.

According to a sixteenth aspect, an embodiment of this disclosure provides a communication apparatus. The communication apparatus includes a processor and a storage medium. The storage medium stores instructions. When the instructions are run by the processor, the processor implements the communication method according to any one of the third aspect or the possible implementations of the third aspect.

According to a seventeenth aspect, this disclosure provides a chip or a chip system. The chip or the chip system includes at least one processor and a communication interface. The communication interface and the at least one processor are interconnected through a line. The at least one processor is configured to run a computer program or instructions, to perform the communication method according to any one of the first aspect or the possible implementations of the first aspect.

According to an eighteenth aspect, this disclosure provides a chip or a chip system. The chip or the chip system includes at least one processor and a communication interface. The communication interface and the at least one processor are interconnected through a line. The at least one processor is configured to run a computer program or instructions, to perform the communication method according to any one of the second aspect or the possible implementations of the second aspect.

According to a nineteenth aspect, this disclosure provides a chip or a chip system. The chip or the chip system includes at least one processor and a communication interface. The communication interface and the at least one processor are interconnected through a line. The at least one processor is configured to run a computer program or instructions, to perform the communication method according to any one of the third aspect or the possible implementations of the third aspect.

The communication interface in the chip may be an input/output interface, a pin, a circuit, or the like.

In a possible implementation, the chip or the chip system described in this disclosure further includes at least one memory, and the at least one memory stores instructions. The memory may be a storage unit inside the chip, for example, a register or a cache, or may be a storage unit (for example, a ROM or a RAM) of the chip.

It should be understood that the second aspect to the nineteenth aspect in embodiments of this disclosure correspond to the technical solutions of the first aspect in embodiments of this disclosure, and beneficial effects achieved in the aspects and feasible implementations corresponding to the aspects are similar. Details are not described again.

DESCRIPTION OF EMBODIMENTS

To clearly describe the technical solutions in embodiments of this disclosure, terms such as "first" and "second" are used in embodiments of this disclosure to distinguish between same items or similar items that provide basically same purposes. For example, a first network and a second network are merely intended to distinguish between different networks, and are not intended to limit a sequence thereof. A person skilled in the art may understand that the terms such as "first" and "second" do not limit a quantity or an execution sequence, and the terms such as "first" and "second" do not indicate a definite difference.

It should be noted that, in this disclosure, the word such as "example" or "for example" is used to represent giving an example, an illustration, or a description. Any embodiment or design scheme described as an "example" or "for example" in this disclosure should not be explained as being more preferred or having more advantages than another embodiment or design scheme. Exactly, use of the word "example" or "for example" or the like is intended to present a relative concept in a specific manner.

In this disclosure, "at least one" indicates one or more, and "a plurality of" indicates two or more. The term "and/or" describes an association relationship between associated objects and indicates that three relationships may exist. For example, A and/or B may indicate the following cases: only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Embodiments of this disclosure provide a communication method. The method in embodiments of this disclosure may be applied to a $5^{th}$ generation (5G) mobile communication system, or may be applied to Long-Term Evolution (LTE). The 5G system is also referred to as a new wireless communication system, a new access technology (NR), or a next-generation mobile communication system.

Figure 1:
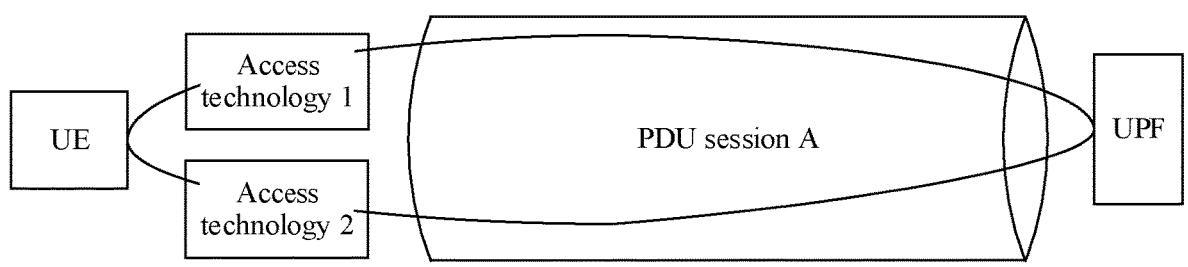
FIG. 1 is a schematic diagram of existing multi-PDU session access.
Figure 2:
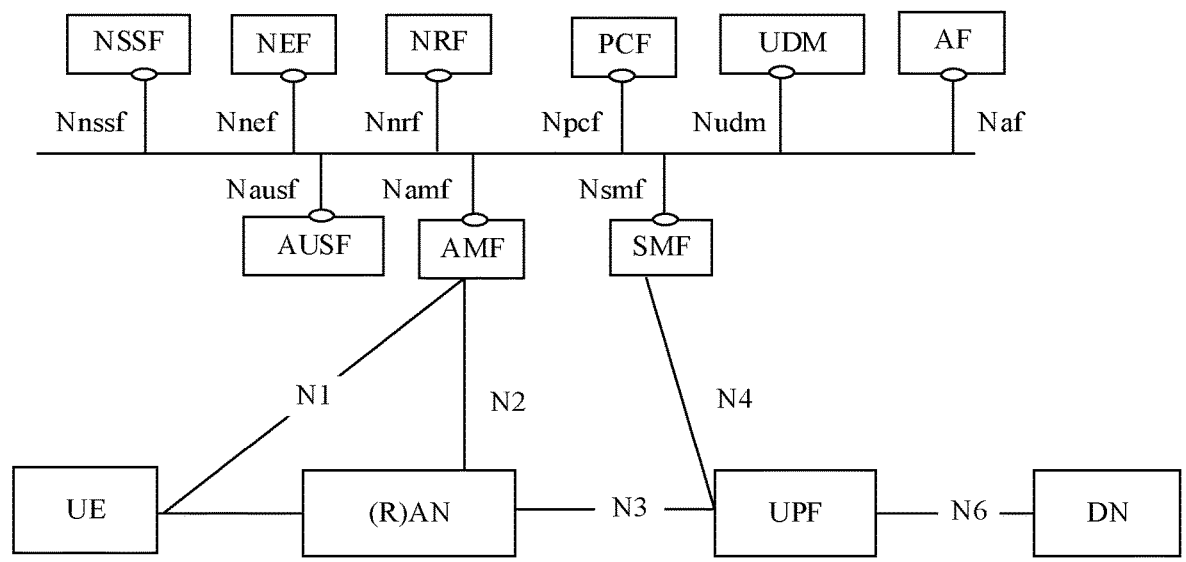
FIG. 2 is a schematic diagram of a network architecture according to an embodiment of this disclosure.

For example, FIG. 2 is a schematic diagram of a network architecture according to an embodiment of this disclosure. The architecture supports access to a core network (CN) by using a wireless technology (for example, LTE or a 5G radio access network (RAN)) that is defined by the $3^{rd}$ Generation Partnership Project (3GPP) standard group, and also supports access to the core network by using a non-3GPP access technology through a non-3GPP interworking function (N3IWF) or a next-generation access gateway (ngPDG).

The network architecture includes a terminal device, an access network (AN), a core network, and a data network (DN). An access network apparatus is mainly configured to implement functions such as a radio physical layer function, resource scheduling, radio resource management, radio access control, and mobility management. A core network device may include a management device and a gateway device. The management device is mainly used for device registration, security authentication, mobility management, location management, and the like of the terminal device. The gateway device is mainly configured to establish a channel to the terminal device, and forward a data packet between the terminal device and an external data network on the channel. The data network may include a network device (for example, a device such as a server or a router), and the data network is mainly used to provide a plurality of data services for the terminal device. For example, an access network, a core network, and a data network in 5G are used as examples for description.

The access network in 5G may be a radio access network ((R)AN). A (R)AN device in the 5G system may include a plurality of 5G-(R)AN nodes. The 5G-(R)AN node may include an access point (AP) in a 3GPP access network or a non-3GPP access network such as a WI-FI network, a next-generation base station (which may be collectively referred to as a next-generation radio access network node (NG-RAN node), where the next-generation base station includes a NR NodeB (gNB), a next-generation evolved NodeB (NG-eNB), a gNB in a form in which a central unit (CU) and a distributed unit (DU) are separated, and the like), a transmission reception point (TRP), a transmission point (TP), or another node.

The 5G core network (e.g., 5G core (5GC)/next generation core (NGC)) includes a plurality of functional units such as an access and mobility management function (AMF) network element, a session management function (SMF) network element, a UPF network element, an authentication server function (AUSF) network element, a policy control function (PCF) network element, an application function (AF) network element, a unified data management (UDM) function network element, a network slice selection function (NSSF) network element, and a network exposure function (NEF) network element.

The AMF network element is mainly responsible for services such as mobility management and access management. The SMF network element is mainly responsible for session management, a dynamic host configuration protocol function, user plane function selection and control, and the like. The UPF network element is mainly responsible for functions related to an external connection to a DN, user plane data packet routing and forwarding, packet filtering, QoS control, and the like. The DN mainly provides a service for user equipment, for example, provides a mobile operator service, an internet service, or a third-party service. The AUSF network element is mainly responsible for a function of authenticating the terminal device. The PCF network element is mainly responsible for providing a unified policy framework for network behavior management, providing a policy rule for a control plane function, obtaining registration information related to a policy decision, and the like. It should be noted that these functional units may independently work, or may be combined to implement some control functions, such as access control and mobility management functions such as access authentication, security encryption, and location registration of the terminal device, and session management functions such as establishment, release, and change of a user plane transmission path. The UDM network element is used for unified user data management, and is mainly configured to store user equipment subscription data.

Functional units in the 5G system may communicate with each other through a next generation (NG) network interface. For example, the terminal device may transmit a control plane message to the AMF network element through an NG interface 1 (N1). The RAN device may establish a user plane communication connection channel to the UPF through an NG interface 3 (N3). The AN/RAN device may establish a control plane signaling connection to the AMF network element through an NG interface 2 (N2). The UPF may exchange information with the SMF network element through an NG interface 4 (N4). The UPF may exchange user plane data with the data network DN through an NG interface 6 (N6). The AMF network element may exchange information with the SMF network element through an NG interface 11 (N11). The SMF network element may exchange information with the PCF network element through an NG interface 7 (N7). The AMF network element may exchange information with the AUSF through an NG interface 12 (N12).

Figure 3:
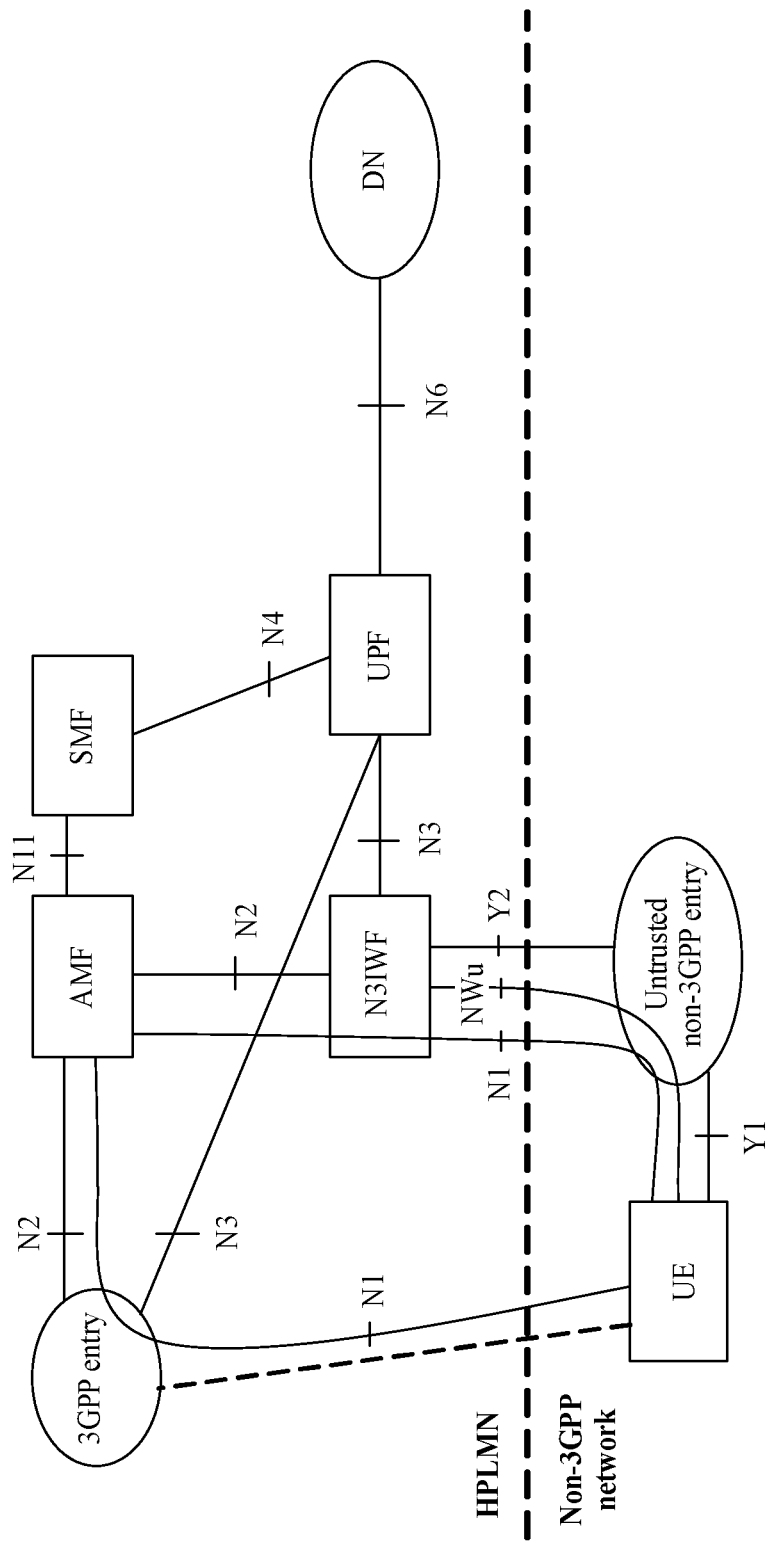
FIG. 3 is another schematic diagram of a network architecture according to an embodiment of this disclosure.

For example, FIG. 3 is a schematic diagram of a specific network architecture when a core network supports untrusted non-3GPP access. A network architecture in a home public land mobile network (HPLMN) is similar to the implementation in FIG. 2, and details are not described herein again. The untrusted non-3GPP access may be untrusted wireless local area network (WLAN) access. In this architecture, the terminal device may further exchange information with an AMF through the untrusted non-3GPP access, a N3IWF, or a non-3GPP access gateway, and an N3IWF network element may exchange information with a UPF through N3.

In addition, the core network may further support trusted non-3GPP access and/or fixed network access. A trusted non-3GPP network includes a trusted WLAN network, and a fixed network includes fixed home network access, fixed wired access, or the like. A network side architecture is similar to the untrusted non-3GPP network architecture. The N3IWF and an untrusted access network are replaced with a trusted non-3GPP access network or a fixed wired access network, or the N3IWF is replaced with a trusted non-3GPP access gateway or a wired access gateway (W-AGF), and the untrusted access network is replaced with a trusted access network or a wired access network. Access network devices between the terminal device and the trusted non-3GPP access gateway may include a WLAN AP, a fixed access network (FAN) device, a switch, a router, and the like.

Regardless of the trusted non-3GPP access or the untrusted non-3GPP access, a point-to-point interface protocol shown in FIG. 2 may be used on a core network side, or a service-based interface architecture consistent with a 3GPP access core network architecture may be used. This is not limited in this embodiment of this disclosure.

In a possible implementation, a 3GPP access technology and the non-3GPP access technology may include a plurality of access standards or frequency bands, and the plurality of access standards or frequency bands may be simultaneously used. For example, 3GPP access includes simultaneous access to the 5GC by using two access technologies: LTE in fourth generation (4G) and NG-RAN in 5G. Non-3GPP WI-FI access also includes simultaneous access in two frequency bands. For example, simultaneous access to the 5GC in a 5 gigahertz (GHz) WI-FI frequency band and a 2.4 GHz WI-FI frequency band. In a possible implementation, UE may simultaneously access the 5GC architecture in at least two of the foregoing four access manners (including simultaneous use of the four access manners).

The method processing in embodiments of this disclosure may be applied to the foregoing 5G 3GPP access architecture, a non-3GPP access architecture, or an architecture in which 3GPP access and non-3GPP access are simultaneously performed, or may be applied to an architecture in which 5G cellular (NG-RAN) access and 4G cellular (LTE) access are simultaneously performed, and the like. A network architecture is not limited in embodiments of this disclosure.

Generally, UE and a UPF network element select a transmission link for a service flow of a PDU session based on a steering mode sent by a network side. For example, a steering policy of the UE or the UPF network element may come from a PCF network element and an SMF network element. For example, a steering policy received by the UE or the UPF network element from the network side for a service flow 1 indicates that a 3GPP link may be used for transmission. However, currently, performance of a 3GPP transmission link in the UE or the UPF network element is poor, resulting in a service flow transmission failure. Alternatively, for example, a steering policy received by the UE or the UPF network element from the network side for a service flow 1 indicates a smallest delay mode, and the UE or the UPF network element selects the 3GPP to transmit the service flow 1 (for example, a delay of the 3GPP is lower than that of the non-3GPP). A bandwidth on a 3GPP side can only be guaranteed to be 10 megabits per second (Mbps), but a guaranteed bandwidth required by the service flow 1 is 20 Mbps. Consequently, 3GPP transmission cannot meet a requirement of the service flow 1.

Based on this, embodiments of this disclosure provide a communication method. A terminal device or a UPF network element may autonomously determine a transmission link for a service flow, so that a transmission link that meets a current link status of the terminal device or the UPF network element can be selected for the service flow, and this implements efficient transmission of the service flow.

The following describes some terms in embodiments of this disclosure.

A PDU session described in embodiments of this disclosure may be a PDU session, or may be a packet data unit session.

A session management network element described in embodiments of this disclosure may be an SMF network element or another network element implementing a session management function, a user plane network element may be a UPF network element or another network element implementing a user plane function, a policy control network element may be a PCF network element or another network element implementing a policy control function, an application network element may be an AF network element or another network element implementing an application function, and a network element may be an NEF network element or another network element implementing a network function, and the like.

For ease of description, subsequent embodiments of this disclosure are described by using an example in which the session management network element is the SMF network element, the user plane network element is the UPF network element, the policy control network element is the PCF network element, the application network element is the AF network element, and the network element is the NEF network element. This example does not limit embodiments of this disclosure.

Data transmission in embodiments of this disclosure may include a process of data sending, data receiving, or data exchange. For example, data transmission performed between the terminal device and the UPF network element may include the terminal device that sends data to the UPF network element, or the UPF network element sends data to the terminal device, or the terminal device sends data to the UPF network element and receives data from the UPF network element, or the UPF network element sends data to the terminal device and receives data from the UPF network element. A service flow in embodiments of this disclosure may be a service flow using a User Datagram Protocol (UDP), a Multi-Path Quick UDP Internet Connection (MP-QUIC) protocol, a Transmission Control Protocol (TCP), a Multipath TCP (MPTCP), a Stream Control Transmission Protocol (SCTP), or another protocol. For example, the service flow of the PDU session may be a PDU session established between the terminal device and the 5G core network (5GC) or a service flow in the session, a PDN connection established between the terminal device and an EPC network or a service flow in the PDN connection, or an Internet Protocol (IP) connection for which the terminal device performs non-seamless offloading (non-seamless WLAN offload) by using a non-3GPP access network (for example, WLAN access) or a service flow in the connection.

In a possible implementation, a service flow identifier in embodiments of this disclosure includes one or more of the following: a PDU session identifier, an N4 session identifier, service flow description information, an application identifier, a QoS flow identifier, a service type identifier, an application type identifier, or a terminal external identifier.

The PDU session identifier is session identification information of the PDU session. The N4 session identifier is session identification information of an N4 interface session (for example, a Packet Forwarding Control Protocol (PFCP) session).

The service flow description information may be at least one piece of service flow IP 5-tuple description information, and the 5-tuple description information may be a source IP address, a destination IP address, a source port number, a destination port number, and a protocol type. Alternatively, the service flow description information may be at least one piece of Ethernet packet header information, for example, a source media access control (MAC) address and a destination MAC address, or a virtual local area network (VLAN) identifier. There may be one or more pieces of service flow description information. This is not limited in embodiments of this disclosure.

The application identifier may be used to identify a service flow of a specific application program. Subsequently, the terminal device or the UPF network element may select a transmission link for a service flow that includes the application identifier. There may be one or more application identifiers. This is not limited in embodiments of this disclosure.

The QoS flow identifier (ID) (QFI) may be an identifier of a QoS flow obtained by aggregating a plurality of service flows whose QoS meets a specific relationship.

The service type identifier may be a type identifier of one or more specific types of service flows. For example, the types of the service flows may include a video service, a voice service, a game service, or a web browsing service.

The application type identifier may be a type identifier of one or more types of applications.

The terminal external identifier may also be referred to as an external identifier (EID) of a terminal, and may include the following two parts: a domain name identifier (DID) and a local identifier (LID). The domain name identifier may be used to identify an access address of a service provided by an operator which may use different domain name identifiers to support access of different services. The local identifier may be used to export or obtain an international mobile subscriber identity (IMSI) of the terminal device. Alternatively, the terminal external identifier is a generic public subscription identifier (GPSI). For example, the GPSI is an external identifier or a phone number (e.g., Mobile Station International Subscriber Directory Number (MSISDN)) of the terminal.

In a possible implementation, a service flow identifier in embodiments of this disclosure includes one or more of the following: service flow description information, an application identifier, a QoS flow identifier, a service type identifier, an application type identifier, or a terminal external identifier. In this implementation, a PDU session identifier or an N4 session identifier may be used as a parameter in the service flow description information. For other information, refer to the descriptions in the foregoing service flow identifier. Details are not described herein again.

A first steering mode described in embodiments of this disclosure may be a steering manner in which a steering enforcement point (for example, the terminal device or the UPF network element) determines a transmission link for a service flow of a PDU session, or may be understood as a steering manner in which a steering enforcement point autonomously selects a transmission link for a service flow of a PDU session.

In a possible implementation, the first steering mode may be an application-based steering mode (or a custom steering mode, an autonomous steering mode, a free steering mode, or the like). In the application-based steering mode, the steering enforcement point may autonomously select an appropriate steering mode or transmission link for a service flow.

In a possible implementation, the first steering mode may be a QoS-based steering mode. In the QoS-based steering mode, the steering enforcement point may select, for a service flow based on a QoS guarantee and the like that can be provided by a link, a transmission link that can meet a QoS requirement of the service flow.

In a possible implementation, the first steering mode may be a bandwidth-based steering mode. In the bandwidth-based steering mode, the steering enforcement point may select, for a service flow based on a bandwidth guarantee and the like that can be provided by a link, a transmission link that can meet a bandwidth requirement of the service flow.

In a possible implementation, the first steering mode may be a redundant transmission steering mode featuring transmission over a plurality of links. In the redundant transmission steering mode featuring transmission over the plurality of links, the steering enforcement point may select one or more (for example, two or more) transmission links for a service flow, to transmit the service flow through the plurality of transmission links at the same time. For example, when one link meets a QoS requirement of a service flow, one link is used for transmission. When one link cannot meet a QoS requirement of a service flow, a plurality of links is used for transmission. Alternatively, one link is first used for transmission of a service flow. In a switching process in which the service flow is switched to another link, two links are used for transmission. After the switching is completed, one link is used for transmission. Alternatively, a plurality of links is always used for transmission of a service flow data packet at the same time. Alternatively, a link is preferentially selected for transmission of a service flow data packet. Otherwise, two links are used for transmission of a service flow data packet at the same time. The QoS requirement includes at least one of a bandwidth, a delay, a packet loss rate, or a jitter. For example, when a QoS requirement of a service flow is a packet loss rate requirement, one link is used for transmission of the service flow, and when a packet loss rate of the foregoing link is greater than a packet loss rate threshold that can be tolerated by the service flow, two links are used for the transmission of the service flow. Alternatively, a link 1 is used for transmission of the service flow, and subsequently, the service flow is switched to a link 2 for transmission. In a switching process in which the service flow is switched from the link 1 to the link 2, the link 1 and the link 2 are used for the transmission of a service flow data packet at the same time. After the switching is completed, only the link 2 is used for the transmission of the service flow data packet.

In a possible implementation, the first steering mode may be a load-balancing mode without a specific split percentage. In the load-balancing mode without the specific split percentage, the steering enforcement point may determine split percentages of two links. For example, one link transmits 20% of a service flow, and the other link transmits 80% of the service flow.

A second steering mode in embodiments of this disclosure may include a smallest delay steering mode, a load-balancing steering mode, a priority-based steering mode, or an active-standby steering mode.

The terminal device in embodiments of this disclosure sends, to the SMF network element, a message requesting to establish or update a PDU session. The message requesting to establish or update a PDU session may be sent for establishing a single-access PDU session, or may be sent for establishing a multi-access (MA) PDU session, or the like. This is not limited in embodiments of this disclosure.

By using specific embodiments, the following describes in detail the technical solutions of this disclosure and how to resolve the foregoing technical problem by using the technical solutions of this disclosure. The following several specific embodiments may be implemented independently or combined with each other, and same or similar concepts or processes may not be repeatedly described in some embodiments.

Figure 4:
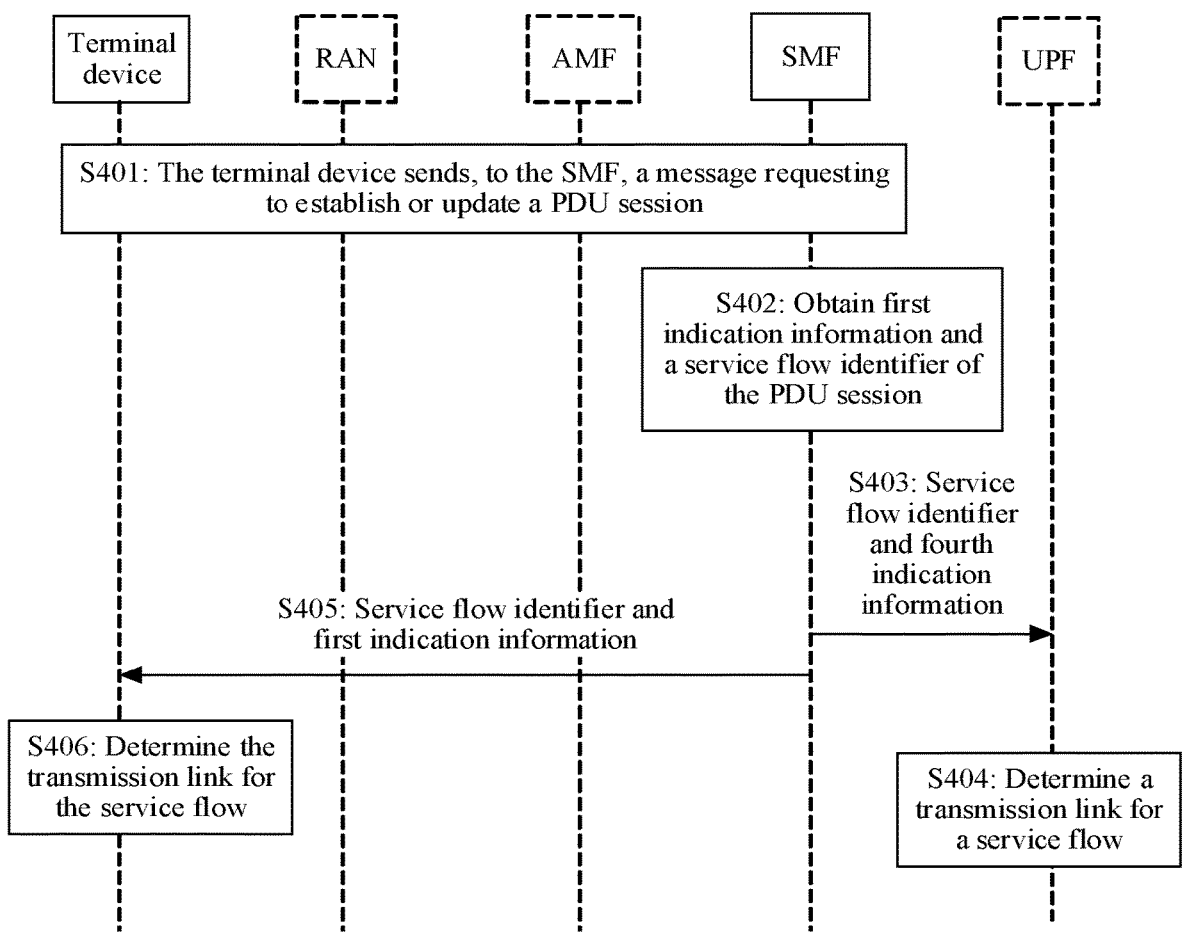
FIG. 4 is a schematic flowchart of a communication method according to an embodiment of this disclosure.

FIG. 4 is a schematic flowchart of a communication method according to an embodiment of this disclosure. The method includes the following steps.

S401: A terminal device sends, to an SMF network element, a message requesting to establish or update a PDU session.

In a possible implementation, the terminal device may encapsulate the message requesting to establish or update a PDU session in a non-access stratum (NAS) transmission message to send the message to an AMF network element, and the AMF network element forwards the message requesting to establish or update a PDU session to the SMF network element.

In a possible implementation, the terminal device may send a NAS transmission message to an AMF network element through a RAN or a non-3GPP access gateway. The NAS transmission message includes the message requesting to establish or update a PDU session. The AMF network element further forwards the message requesting to establish or update a PDU session to the SMF network element.

It may be understood that the terminal device may alternatively send, to the SMF network element in any manner based on an actual application scenario, the message requesting to establish or update a PDU session. This is not limited in this embodiment of this disclosure.

S402: The SMF network element obtains first indication information and a service flow identifier of the PDU session.

In this embodiment of this disclosure, the first indication information indicates the terminal device or a UPF network element to determine a transmission link for a service flow of the PDU session. In a possible understanding, the first indication information may indicate a steering enforcement point to autonomously determine a transmission link for a service flow of a PDU session of the steering enforcement point. For example, when the steering enforcement point is the terminal device, the first indication information indicates the terminal device to determine the transmission link for the service flow of the PDU session. For example, when the steering enforcement point is the UPF network element, the first indication information indicates the UPF network element to determine the transmission link for the service flow of the PDU session.

In this embodiment of this disclosure, the first indication information may be a character, a character string, a number, or the like. This is not limited in this embodiment of this disclosure.

For example, the first indication information may indicate information about a first steering mode. Specific content of the first steering mode is described above, and details are not described herein again. In this implementation, it may be understood that the first steering mode is defined. When a network side sends, to the steering enforcement point, the first indication information indicating the first steering mode, the first indication information may indicate the steering enforcement point to use a steering mode in which the transmission link for the service flow of the PDU session is autonomously determined.

For example, the first indication information may be steering indication information. In a possible implementation, the steering indication information may indicate the steering enforcement point to select one or more other transmission links for the service flow of the PDU session when a link selected based on a common steering mode (for example, the foregoing second steering mode, where the second steering mode may be determined by the SMF network element in a common manner and sent to the steering enforcement point) does not meet a transmission requirement of the service flow of the PDU session. In this implementation, it may be understood that when the network side sends the first indication information to the steering enforcement point, the first indication information may indicate the steering enforcement point to first select the transmission link based on the common steering mode. If the transmission link does not meet the transmission requirement of the service flow of the PDU session, the one or more other transmission links are selected for the service flow of the PDU session, so that another selected transmission link may be used for transmission of the service flow of the PDU session. For example, the second steering mode is a smallest delay mode, and the steering enforcement point determines, based on the second steering mode, a link with a smallest delay (for example, a round-trip time (RTT)) in a plurality of links as a transmission path for the service flow. However, when the foregoing link cannot meet a QoS requirement of the service flow, for example, a packet loss rate of the foregoing link is higher than an allowed packet loss rate of the service flow, the steering enforcement point selects another link to transmit the service flow, for example, selects a link with a second smallest delay to transmit data for the service flow.

In a possible implementation, the steering indication information may indicate the steering enforcement point to select one or more transmission links for the service flow of the PDU session based on the second steering mode and the steering indication information. For example, when the second steering mode is a load-balancing steering mode, the steering indication information may be a split percentage of at least one link. The split percentage is a specific value, and the specific split percentage value indicates a transmission split percentage when the steering enforcement point determines that the at least one link transmits the service flow. The transmission split percentage may be a percentage of a data volume of the service flow transmitted on each transmission link to a data volume of the entire service flow, for example, any value from 0% to 100%. The specific split percentage value may be NULL, 0%, 100%, or another predetermined value. For example, specific split percentages for both 3GPP and non-3GPP links are set to NULL or 100%. It may be understood that, in this implementation, there is an association relationship between the second steering mode and the steering indication information, and different second steering modes correspond to different steering indication information.

In a possible implementation, the SMF network element may determine the first indication information and the service flow identifier based on a local policy of the SMF network element. For example, it is indicated in the local policy of the SMF network element that a service flow identified by a service flow identifier A of the PDU session uses a manner in which the steering enforcement point determines the transmission link for the service flow of the PDU session, and the SMF network element may determine the first indication information and the service flow identifier A.

In possible implementations, the SMF network element may alternatively obtain the first indication information and the service flow identifier from a PCF network element, or the SMF network element may determine the first indication information and the service flow identifier based on information obtained from the UPF network element or the PCF network element. Interaction between the SMF network element and the PCF network element or between the SMF network element and the UPF network element is related in the two implementations and is described in detail in a subsequent embodiment. Details are not described herein.

S403: The SMF network element sends the service flow identifier and the first indication information to the UPF network element.

S404: The UPF network element selects the transmission link for the service flow of the PDU session based on the service flow identifier and the first indication information.

In this embodiment of this disclosure, the SMF network element may send the service flow identifier and the first indication information to the UPF network element in any manner. This is not limited in this embodiment of this disclosure.

The UPF network element may receive the service flow identifier and the first indication information from the SMF network element. For a service flow of a PDU session in a downlink, the UPF network element may select a transmission link for a downlink data packet of the service flow. For example, the UPF network element may identify a service type or an application type of the service flow, and select a transmission link for the downlink data packet of the service flow based on the service type or the application type. There may be one or more transmission links. This is not limited in this embodiment of this disclosure.

In a possible implementation, the UPF network element may identify the service type or the application type of the service flow based on deep packet inspection (DPI) or the like.

In a possible implementation, the UPF network element may select, based on at least one of a user preference, an application preference, or a local policy, the one or more transmission links for the service flow corresponding to the service flow identifier.

For example, the user preference may be a transmission path that is set by a user and that is preferentially selected for a service flow. For example, the user preferentially selects non-3GPP transmission for a video service flow, and the UPF network element selects, based on the user preference, the one or more transmission links for the service flow corresponding to the service flow identifier. This helps implement that a transmission result of the service flow meets a user requirement, thereby improving user experience.

The application preference may be a transmission link that is selected by an application and that is used to transmit a service flow of the application. For example, the application sets a preferentially selected link of the application to non-3GPP, and the UPF network element selects, based on the application preference, the one or more transmission links for the service flow corresponding to the service flow identifier. This helps meet a QoS requirement, a charging requirement, or the like of the application.

The local policy may be that the UPF network element locally configures a steering mode or a transmission path for a service flow, and the UPF network element selects, based on the local policy, the one or more transmission links for the service flow corresponding to the service flow identifier, to meet transmission control of an operator on the service flow. For example, the UPF network element may identify the service type or the application type of the service flow, and select the transmission link based on the local policy of the UPF network element. For example, if the local policy of the UPF network element is to configure that a video service is preferentially transmitted over a non-3GPP link, and the UPF network element identifies that the service type or the application type of the service flow is a video service, a data packet of the service flow is sent to a transmission link corresponding to a non-3GPP access technology. The local policy may be configured by the operator on the UPF network element.

In a possible implementation, the UPF network element may select, based on at least two of a link status, a transmission condition threshold, the service type, or the application type, the one or more transmission links for the service flow corresponding to the service flow identifier.

The UPF network element selects, based on at least two of the link status, the transmission condition threshold, the service type, or the application type, the one or more transmission links for the service flow corresponding to the service flow identifier. This helps select an optimal transmission link for the service flow based on a current link status.

For example, the UPF network element selects, based on the link status and the transmission condition threshold, the one or more transmission links for the service flow corresponding to the service flow identifier. The transmission condition threshold may be a transmission condition threshold tolerable for service flow transmission, or a link status threshold indicating whether a link is available. For example, the UPF network element learns that a packet loss rate of a link 1 is 5%, and a packet loss rate of a link 2 is 10%. However, a maximum tolerable packet loss rate of the service flow corresponding to the service flow identifier is 7%. Therefore, the UPF network element determines, based on the transmission condition threshold (namely, 7%), that the link 2 is unavailable and the link 1 is available, and the UPF network element uses the link 1 to transmit the service flow. Alternatively, the transmission condition threshold is an availability threshold of a link. For example, an availability threshold of the link 1 is that a delay is less than 1 millisecond (ms) and a packet loss rate is less than 10%. Therefore, when a status, for example, a delay or a packet loss rate, of a link does not meet the foregoing availability threshold requirement, the link is unavailable. In this solution, the UPF network element may select the optimal transmission link for the service flow based on the current link status. This improves transmission quality and ensures the QoS of the service flow.

When the UPF network element selects, based on the link status, the transmission condition threshold, and the service type, the one or more transmission links for the service flow corresponding to the service flow identifier, the UPF network element may select an optimal transmission link based on a QoS requirement determined by using the service type and based on the link status and the transmission condition threshold.

In a possible implementation, the UPF network element may select, based on the user preference and/or the application preference and/or the local policy, and the link status and/or the transmission condition threshold, the one or more transmission links for the service flow corresponding to the service flow identifier.

The UPF network element selects, based on the user preference or the application preference, the link status, and the transmission condition threshold, the one or more transmission links for the service flow corresponding to the service flow identifier. In this way, the user preference and the QoS requirement of the service flow are met, a better transmission service is provided based on the link status, and user service experience is improved.

For example, when the first indication information indicates a steering mode in which the UPF network element selects, for the service flow, a transmission link that meets the transmission QoS requirement of the service flow, the UPF network element obtains a status parameter of at least one link, for example, at least one of a guaranteed bandwidth value of a link, a delay value (for example, a smallest delay, a maximum delay, or an average delay), a link packet loss rate, or a link jitter value. The UPF network element compares the status parameter of the link with the QoS requirement of the service flow. When only one of a plurality of links can meet the QoS requirement of the service flow, the UPF network element selects the link to transmit the service flow. When a plurality of links in a plurality of links can meet the QoS requirement of the service flow, one or more links are selected to transmit the service flow. For example, any one or more links that can meet the QoS requirement may be selected to transmit a service flow data packet. Alternatively, one or more links may be preferentially selected based on a priority, the user preference, or the application preference from the links that can meet the QoS requirement to transmit a service flow data packet. In a possible implementation, the QoS requirement includes but is not limited to the guaranteed bandwidth value, the delay value, the packet loss rate, the jitter, and the like. For example, in QoS parameters of a service flow 1, a guaranteed bandwidth is required to be 10 Mbps. The UPF network element obtains that a guaranteed bandwidth that can be provided by a 3GPP access link is 20 Mbps and a guaranteed bandwidth value of a non-3GPP link is 5 Mbps. Therefore, the UPF network element selects the 3GPP access link to transmit the service flow 1. For another example, in QoS parameters of a service flow 2, a guaranteed bandwidth is required to be 10 Mbps. The UPF network element obtains that a maximum bandwidth that can be provided by the 3GPP access link is 20 Mbps and a maximum bandwidth value of the non-3GPP link is 5 Mbps. Therefore, the UPF selects the 3GPP link to transmit the service flow 2. For still another example, in QoS parameters of a service flow 3, a maximum delay for transmission is required to be 1 ms. The UPF network element obtains that a transmission delay of the 3GPP link is 50 microseconds (µs) and a transmission delay of the non-3GPP link is 80 µs. Therefore, both the 3GPP link and the non-3GPP link may be used as candidate links to meet a QoS requirement of the service flow 3. The UPF network element randomly selects the 3GPP or the non-3GPP to transmit the service flow 3, the UPF network element preferentially selects, based on the local policy, the 3GPP to transmit the service flow 3, or the UPF network element selects both the 3GPP link and the non-3GPP link to transmit the service flow 3.

For example, when the first indication information is QoS-related steering indication information, the UPF network element may select a transmission path for the service flow based on the common steering mode, and then the UPF network element determines whether the transmission path can meet the QoS requirement of the service flow. If the transmission path cannot meet the QoS requirement of the service flow, another link is selected to transmit the service flow.

In a possible implementation, when receiving the first indication information, the UPF network element may alternatively report a service flow feature, a service flow type, an application type, an application identifier, or the like that is identified to the SMF network element. The SMF network element determines a target steering mode for the UPF network element based on the service flow feature, the service type, the application type, the application identifier, or the like. Then, the UPF network element may transmit the service flow based on the target steering mode. For example, the target steering mode may be any one of the second steering modes. In this manner, the SMF network element may determine, for the UPF network element, the target steering mode to which the service flow is applicable, so that an appropriate steering mode can be obtained, and computing load of the UPF network element can be reduced.

S405: The SMF network element sends the service flow identifier and the first indication information to the terminal device.

S406: The terminal device selects the transmission link for the service flow of the PDU session based on the service flow identifier and the first indication information.

In this embodiment of this disclosure, the SMF network element may send the service flow identifier and the first indication information to the terminal device in any manner. This is not limited in this embodiment of this disclosure.

The terminal device may receive the service flow identifier and the first indication information from the SMF network element. For a service flow of a PDU session in an uplink, the terminal device may select a transmission link for an uplink data packet of the service flow. For example, the terminal device may identify a service type or an application type of the service flow, and select a transmission link for the uplink data packet of the service flow based on the service type or the application type. There may be one or more transmission links. This is not limited in this embodiment of this disclosure.

In a possible implementation, the terminal device may select, based on at least one of the user preference, the application preference, or the local policy, the one or more transmission links for the service flow corresponding to the service flow identifier.

For example, the user preference may be a transmission path that is set by a user and that is preferentially selected for a service flow. For example, the user preferentially selects non-3GPP transmission for a video service flow, and the terminal device selects, based on the user preference, the one or more transmission links for the service flow corresponding to the service flow identifier. This helps implement that a transmission result of the service flow meets a user requirement, thereby improving user experience.

The application preference may be a transmission link that is selected by an application and that is used to transmit a service flow of the application. For example, the application sets a preferentially selected link of the application to non-3GPP, and the terminal device selects, based on the application preference, the one or more transmission links for the service flow corresponding to the service flow identifier. This helps meet a QoS requirement, a charging requirement, or the like of the application.

The local policy may be that the terminal device locally configures a steering mode or a transmission path for a service flow, and the terminal device selects, based on the local policy, the one or more transmission links for the service flow corresponding to the service flow identifier, to meet transmission control of an operator on the service flow. For example, the local policy of the terminal device may include a policy configured by a network side on the terminal device, or a policy configured by the user on the terminal device. For example, the local policy of the terminal device indicates that a 3GPP access technology and/or a non-3GPP access technology are/is preferentially selected, or the 3GPP access technology and/or the non-3GPP access technology are/is preferentially selected for transmission of an application or an application of a specified type (for example, a video application, a voice application, or a game application). Therefore, when identifying a service flow of the application or the application of the specified type, the terminal device may select the preferentially selected manner in the local policy to select a transmission link for the service flow.

In a possible implementation, the terminal device may select, based on at least two of the link status, the transmission condition threshold, the service type, or the application type, the one or more transmission links for the service flow corresponding to the service flow identifier.

The terminal device selects, based on at least two of the link status, the transmission condition threshold, the service type, or the application type, the one or more transmission links for the service flow corresponding to the service flow identifier. This helps select an optimal transmission link for the service flow based on a current link status.

For example, the terminal device selects, based on the link status and the transmission condition threshold, the one or more transmission links for the service flow corresponding to the service flow identifier. The transmission condition threshold may be a transmission condition threshold tolerable for service flow transmission, or a link status threshold indicating whether a link is available. For example, the terminal device learns that a packet loss rate of a link 1 is 5%, and a packet loss rate of a link 2 is 10%. However, a maximum tolerable packet loss rate of the service flow corresponding to the service flow identifier is 7%. Therefore, the terminal device determines, based on the transmission condition threshold (namely, 7%), that the link 2 is unavailable and the link 1 is available, and the terminal device uses the link 1 to transmit the service flow. Alternatively, the transmission condition threshold is an availability threshold of a link. For example, an availability threshold of the link 1 is that a delay is less than 1 ms and a packet loss rate is less than 10%. Therefore, when a status, for example, a delay or a packet loss rate, of a link does not meet the foregoing availability threshold requirement, the link is unavailable. In this solution, the UPF network element may select the optimal transmission link for the service flow based on the current link status. This improves transmission quality and ensures the QoS of the service flow.

When the terminal device selects, based on the link status, the transmission condition threshold, and the service type, the one or more transmission links for the service flow corresponding to the service flow identifier, the terminal device may select an optimal transmission link based on a QoS requirement determined by using the service type and based on the link status and the transmission condition threshold.

In a possible implementation, the terminal device may select, based on the user preference and/or the application preference and/or the local policy, and the link status and/or the transmission condition threshold, the one or more transmission links for the service flow corresponding to the service flow identifier.

The terminal device selects, based on the user preference or the application preference, the link status, and the transmission condition threshold, the one or more transmission links for the service flow corresponding to the service flow identifier. In this way, the user preference and the QoS requirement of the service flow are met, a better transmission service is provided based on the link status, and user service experience is improved. For example, when the first indication information indicates a steering mode in which the terminal device selects, for the service flow, a transmission link that meets the transmission QoS requirement of the service flow, the terminal device obtains a status parameter of at least one link, for example, at least one of the guaranteed bandwidth value of the link, the delay value (for example, the smallest delay, the maximum delay, or the average delay), the link packet loss rate, or the link jitter value. The terminal device compares the status parameter of the link with the QoS requirement of the service flow. When only one of a plurality of links can meet the QoS requirement of the service flow, the terminal device selects the link to transmit the service flow. When a plurality of links in a plurality of links can meet the QoS requirement of the service flow, one or more links are selected to transmit the service flow. For example, any one or more links that can meet the QoS requirement may be selected to transmit a service flow data packet. Alternatively, one or more links may be preferentially selected based on a priority, the user preference, or the application preference from the links that can meet the QoS requirement to transmit a service flow data packet. In a possible implementation, the QoS requirement includes but is not limited to the guaranteed bandwidth value, the delay value, the packet loss rate, the jitter, and the like. For example, in QoS parameters of a service flow 1, a guaranteed bandwidth is required to be 10 Mbps. The terminal device obtains that a guaranteed bandwidth that can be provided by a 3GPP access link is 20 Mbps and a guaranteed bandwidth value of a non-3GPP link is 5 Mbps. Therefore, the terminal device selects the 3GPP access link to transmit the service flow 1. For another example, in QoS parameters of a service flow 2, a guaranteed bandwidth is required to be 10 Mbps. The terminal device obtains that a maximum bandwidth that can be provided by the 3GPP access link is 20 Mbps and a maximum bandwidth value of the non-3GPP link is 5 Mbps. Therefore, the terminal device selects the 3GPP link to transmit the service flow 2. For still another example, in QoS parameters of a service flow 3, a maximum delay for transmission is required to be 1 ms. The terminal device obtains that a transmission delay of the 3GPP link is 50 µs and a transmission delay of the non-3GPP link is 80 µs. Therefore, both the 3GPP link and the non-3GPP link may be used as candidate links to meet a QoS requirement of the service flow 3. The terminal device randomly selects the 3GPP or the non-3GPP to transmit the service flow 3, the terminal device preferentially selects, based on the local policy, the 3GPP to transmit the service flow 3, or the terminal device selects both the 3GPP link and the non-3GPP link to transmit the service flow 3.

For example, when the first indication information is QoS-related steering indication information, the terminal device may select a transmission path for the service flow based on the common steering mode, and then the terminal device determines whether the transmission path can meet the QoS requirement of the service flow. If the transmission path cannot meet the QoS requirement of the service flow, another link is selected to transmit the service flow.

In this embodiment of this disclosure, S405 and S406 may be performed before S403 and S404, or S405 and S406 may be synchronously performed with S403 and S404, or the like. An execution sequence of the steps is not limited in this embodiment of this disclosure.

In conclusion, in this embodiment of this disclosure, the terminal device or the UPF network element may autonomously determine the transmission link for the service flow, so that the transmission link that meets the current link status of the terminal device or the UPF network element can be selected for the service flow, and this implements efficient transmission of the service flow.

Based on the embodiment corresponding to FIG. 4, in a possible implementation, an implementation in which the SMF network element obtains first indication information and a service flow identifier of the PDU session in S402 may be as follows. The SMF network element receives second indication information and the service flow identifier of the PDU session from a PCF network element.

Figure 5:
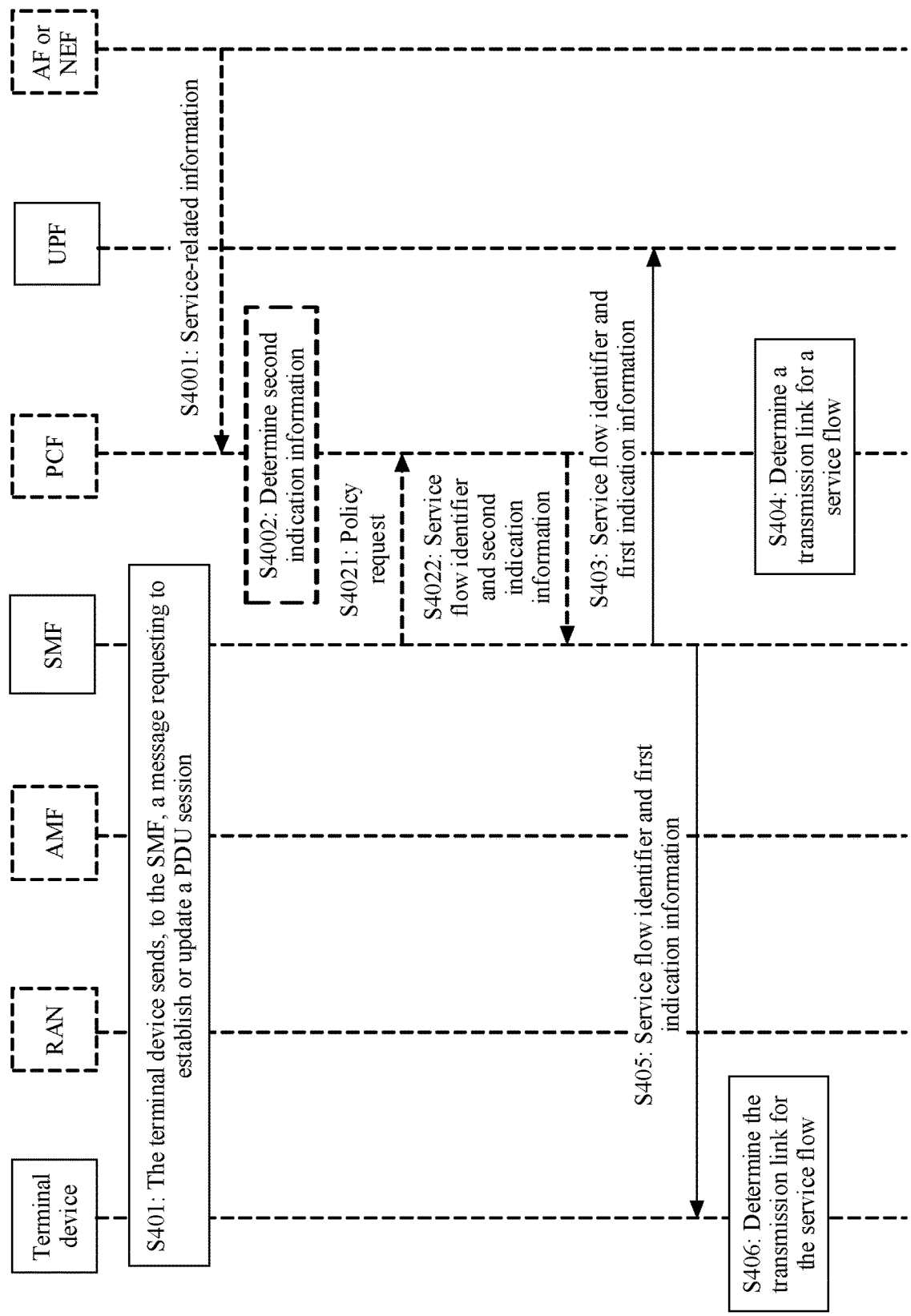
FIG. 5 is a schematic flowchart of a specific communication method according to an embodiment of this disclosure.

For example, as shown in FIG. 5, S402 may include the following steps. S4021: The SMF network element sends a policy request to the PCF network element. S4022: The SMF network element receives the second indication information and the service flow identifier of the PDU session from the PCF network element, where the second indication information indicates a terminal device or a UPF network element to determine a transmission link for a service flow of the PDU session.

In this embodiment of this disclosure, the second indication information is sent by the PCF network element to the SMF network element, and indicates the terminal device or the UPF network element to determine the transmission link for the service flow of the PDU session. After receiving the second indication information, the SMF network element may determine the first indication information indicating the terminal device or the UPF network element to determine the transmission link for the service flow of the PDU session, and further send the first indication information to the terminal device or the UPF network element. In a possible understanding, both the first indication information and the second indication information indicate the terminal device or the UPF network element to determine the transmission link for the service flow of the PDU session. The first indication information is information sent by the SMF network element to the terminal device or the UPF network element, and the second indication information is sent by the PCF network element to the SMF network element. Specific forms of the first indication information and the second indication information may be the same or may be different. This is not limited in this embodiment of this disclosure.

In a possible implementation, the PCF network element may obtain service-related information from an AF network element or an NEF network element, and further obtain the second indication information and the service flow identifier of the PDU session.

For example, as shown in FIG. 5, the method may further include the following steps. S4001: The PCF network element obtains the service-related information from the AF network element or the NEF network element. S4002: The PCF network element obtains the second indication information and the service flow identifier of the PDU session. In this embodiment of this disclosure, steps S4001 and S4002 may be performed in any phase before S4022.

The service-related information may be related information of a service flow corresponding to the service flow identifier of the PDU session. For example, the service-related information includes one or more of the following: access technology-related information, disorder-sensitive indication information, packet loss-sensitive indication information, delay-sensitive indication information, jitter-sensitive indication information, multi-access allowed indication information, or multi-access forbidden indication information.

The access technology-related information may include at least one of a preferred access technology, an allowed access technology, or a forbidden access technology. The disorder-sensitive indication information, the packet loss-sensitive indication information, the delay-sensitive indication information, and the jitter-sensitive indication information indicate that service quality is greatly affected when a disorder, a packet loss, a delay, or a jitter occurs. Therefore, for a service including the foregoing indication, the disorder, the packet loss, the delay, or the jitter should be avoided as much as possible during transmission.

The PCF network element may determine a specific form of the second indication information based on the related information of the service flow.

For example, when a service flow is allowed to be transmitted through 3GPP and/or non-3GPP, the PCF network element may determine that the second indication information is information indicating a first steering mode.

For example, the PCF network element may determine that the second indication information is steering indication information. Optionally, the PCF network element further determines a second steering mode, and sends both the second steering mode and the second indication information to the SMF network element. For example, in an implementation in which the PCF network element determines the second steering mode, for a delay-sensitive service, a smallest delay steering mode (i.e., lowest RTT) is selected, that is, a link with a smallest RTT is selected to transmit a service data packet. For a packet loss-sensitive service, a redundant transmission steering mode or an MPTCP steering mode is selected. In the redundant transmission steering mode, the service data packet may be simultaneously transmitted on a plurality of links. In the MPTCP steering mode, the service data packet may be transmitted through an MPTCP protocol. For a disorder-sensitive service, the MPTCP steering mode or a QUIC transmission mode is selected. In the QUIC transmission mode, the service flow data packet may be transmitted through a QUIC protocol. For a jitter-sensitive service, a low-jitter link is selected to transmit the service flow data packet, for example, a 3GPP access technology or a fixed network access technology is selected to transmit the service flow data packet.

In this embodiment of this disclosure, the SMF network element may determine, based on an indication of the PCF network element, a manner in which the terminal device or the UPF network element determines the transmission link for the service flow of the PDU session, so that computing load of the SMF network element can be reduced.

Based on the embodiment corresponding to FIG. 4, in a possible implementation, an implementation in which the SMF network element obtains first indication information and a service flow identifier of the PDU session in S402 may be as follows. The SMF network element receives third indication information and the service flow identifier of the PDU session from a PCF network element.

Figure 6:
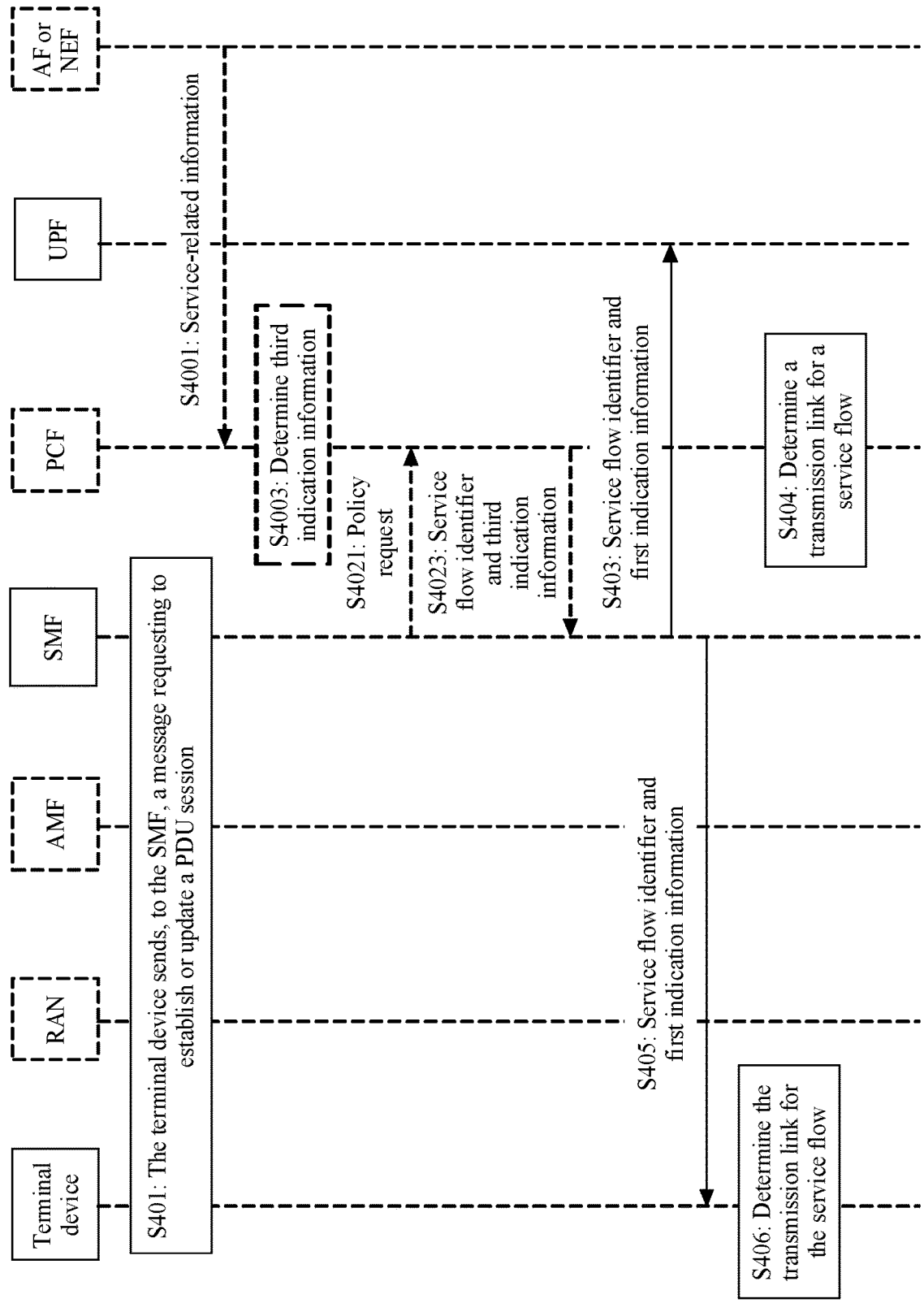
FIG. 6 is a schematic flowchart of another specific communication method according to an embodiment of this disclosure.

For example, as shown in FIG. 6, S402 may include the following steps. S4021: The SMF network element sends a policy request to the PCF network element. S4023: The SMF network element receives the third indication information and the service flow identifier of the PDU session from the PCF network element, where the third indication information indicates the SMF network element to determine a second steering mode and/or the first indication information.

In this embodiment of this disclosure, the third indication information is sent by the PCF network element to the SMF network element, and indicates the SMF network element to determine the second steering mode and/or the first indication information. After receiving the third indication information, the SMF network element may determine the first indication information indicating a terminal device or a UPF network element to determine a transmission link for a service flow of the PDU session. In a possible implementation, the first indication information may be information indicating a first steering mode, and the first indication information is further sent to the terminal device or the UPF network element. In a possible implementation, the first indication information may be steering indication information. The SMF network element may alternatively determine the second steering mode, and further send the first indication information and the second steering mode to the terminal device or the UPF network element.

In a possible implementation, the PCF network element may obtain service-related information from an AF network element or an NEF network element, and further obtain the third indication information and the service flow identifier of the PDU session.

For example, as shown in FIG. 6, the method may further include the following steps. S4001: The PCF network element obtains the service-related information from the AF network element or the NEF network element. S4003: The PCF network element obtains the third indication information and the service flow identifier of the PDU session. In this embodiment of this disclosure, steps S4001 and S4003 may be performed in any phase before S4023.

The service-related information may be related information of a service flow corresponding to the service flow identifier of the PDU session. For example, the service-related information includes one or more of the following: access technology-related information, disorder-sensitive indication information, packet loss-sensitive indication information, delay-sensitive indication information, jitter-sensitive indication information, multi-access allowed indication information, or multi-access forbidden indication information.

The access technology-related information may include at least one of a preferred access technology, an allowed access technology, or a forbidden access technology. The disorder-sensitive indication information, the packet loss-sensitive indication information, the delay-sensitive indication information, and the jitter-sensitive indication information indicate that service quality is greatly affected when a disorder, a packet loss, a delay, or a jitter occurs. Therefore, for a service including the foregoing indication, the disorder, the packet loss, the delay, or the jitter should be avoided as much as possible during transmission.

In this embodiment of this disclosure, after receiving the third indication information, the SMF network element may determine the first indication information based on a local policy, the service-related information, service flow feature information (where with reference to FIG. 7, the SMF network element sends fourth indication information to the UPF network element to obtain the service flow feature information), or the like. Refer to the descriptions of the embodiment corresponding to FIG. 4. Details are not described herein again.

In this embodiment of this disclosure, the SMF network element may determine the first indication information based on a requirement of the SMF network element, to obtain the first indication information that better meets the requirement of the SMF network element.

Figure 7:
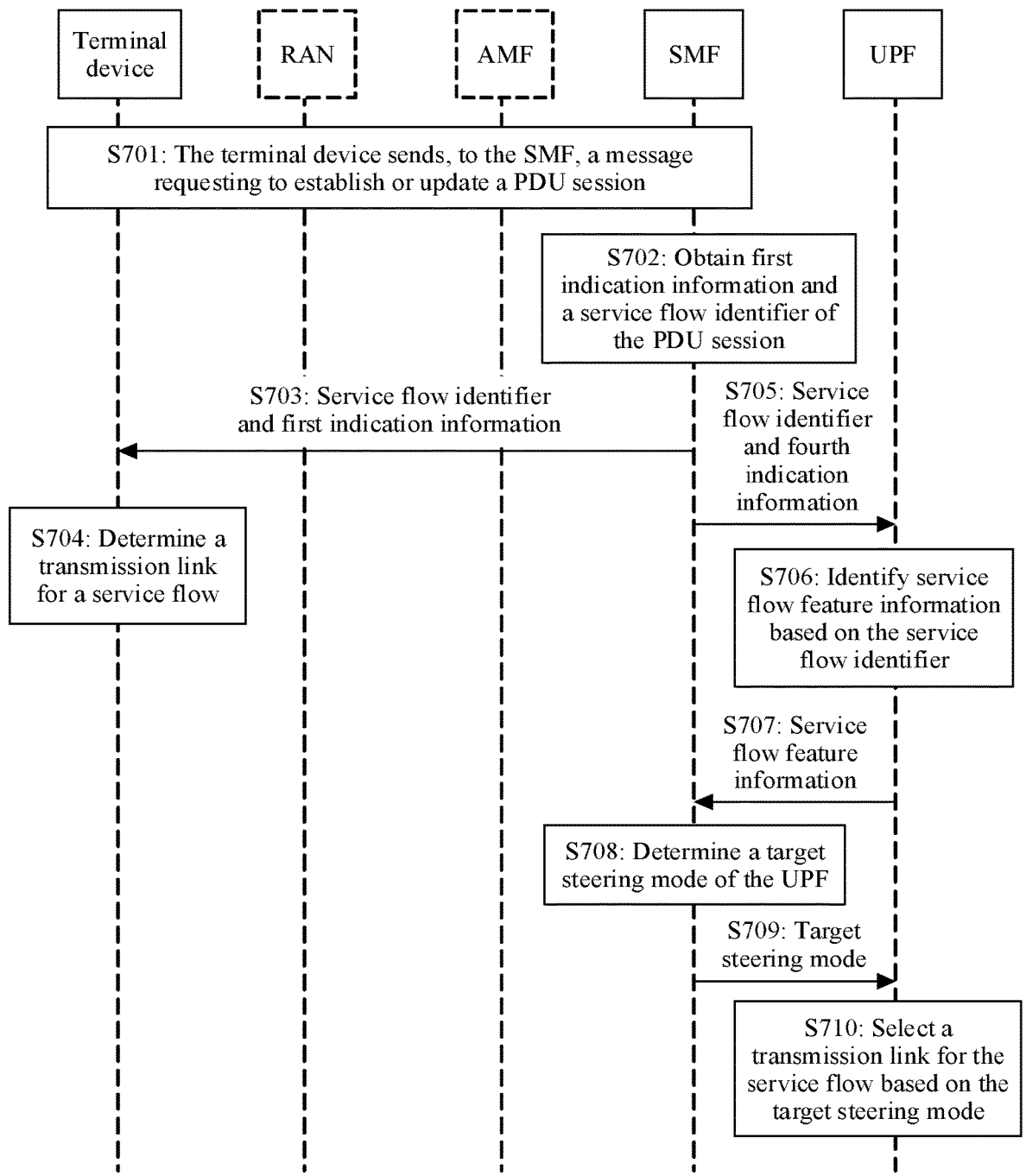
FIG. 7 is a schematic flowchart of another communication method according to an embodiment of this disclosure.

FIG. 7 is a schematic flowchart of a communication method according to an embodiment of this disclosure. The method includes the following steps.

S701: A terminal device sends, to an SMF network element, a message requesting to establish or update a PDU session.

S702: The SMF network element obtains first indication information and a service flow identifier of the PDU session.

S703: The SMF network element sends the service flow identifier and the first indication information to the terminal device.

S704: The terminal device selects a transmission link for a service flow of the PDU session based on the service flow identifier and the first indication information.

In this embodiment of this disclosure, for steps S701 to S704, refer to the descriptions of S401, S402, S405, and S406 in the embodiment corresponding to FIG. 4. Details are not described herein again.

S705: The SMF network element sends the service flow identifier and fourth indication information to a UPF network element. The fourth indication information indicates the UPF network element to report service flow feature information related to the service flow identifier.

S706: The UPF network element identifies the service flow feature information based on the service flow identifier.

S707: The UPF network element sends the service flow feature information to the SMF network element.

S708: The SMF network element determines a target steering mode of the UPF network element.

S709: The SMF network element sends the target steering mode to the UPF network element.

S710: The UPF network element selects a transmission link for the service flow based on the target steering mode.

In this embodiment of this disclosure, the SMF network element sends, to the UPF network element, the fourth indication information indicating the UPF network element to report the service flow feature information related to the service flow identifier. After identifying the service flow feature information corresponding to the service flow identifier, the UPF network element sends the service flow feature information to the SMF network element. Further, the SMF network element may determine the target steering mode for the UPF network element based on the service flow feature information. The UPF network element may select the transmission link for the service flow based on the target steering mode, to transmit the service flow. For example, the target steering mode may be a second steering mode, for example, any one of a lowest RTT, a load-balancing mode, an active-standby mode, a priority-based mode, or a redundant transmission mode. The service flow feature information may include a service type, an application type, an application identifier, or the like. This is not limited in this embodiment of this disclosure. In this embodiment, a method used by the UPF network element to obtain the service flow feature information is not limited. For example, the UPF network element may obtain the service flow feature information through DPI detection. Further, the UPF network element performs the DPI detection on the service flow based on the fourth indication information, to obtain the service flow feature information.

In this manner, the SMF network element may determine, for the UPF network element, the target steering mode to which a current service flow of the UPF network element is applicable, so that an appropriate steering mode can be obtained, and computing load of the UPF network element can be reduced.

The foregoing describes the methods in embodiments of this disclosure with reference to FIG. 4 to FIG. 7. The following describes a communication apparatus that is provided in embodiments of this disclosure and that performs the foregoing methods. A person skilled in the art may understand that a method and an apparatus may be mutually combined and referenced. A communication apparatus provided in embodiments of this disclosure may perform the steps performed by the terminal device in the foregoing communication methods. Another communication apparatus may perform the steps performed by the UPF network element in the communication methods in the foregoing embodiments. Still another communication apparatus may perform the steps performed by the SMF network element in the communication methods in the foregoing embodiments. Yet another communication apparatus may perform the steps performed by the PCF network element in the communication methods in the foregoing embodiments.

Descriptions are provided below by using an example in which functional modules are obtained through division based on corresponding functions.

Figure 8:
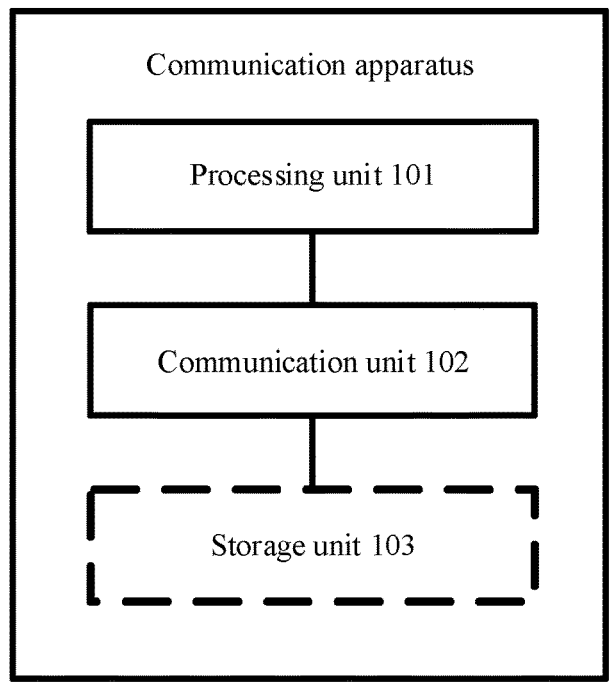
FIG. 8 is a first schematic diagram of a structure of a communication apparatus according to an embodiment of this disclosure.

FIG. 8 is a schematic diagram of a structure of a communication apparatus according to an embodiment of this disclosure. The communication apparatus may be an SMF network element, a UPF network element, a PCF network element, or a terminal device in embodiments of this disclosure, or may be a chip used in the SMF network element, the UPF network element, the PCF network element, or the terminal device. The communication apparatus includes a processing unit 101 and a communication unit 102. The communication unit 102 is configured to support the communication apparatus in performing the step of sending or receiving information. The processing unit 101 is configured to support the communication apparatus in performing the step of processing information.

In an example, the communication apparatus is a terminal device or a chip or a chip system used in the terminal device.

The communication unit 102 is configured to support the communication apparatus in performing S401 and S405 in the foregoing embodiments. The processing unit 101 is configured to support the communication apparatus in performing S406 in the foregoing embodiments.

In another example, the communication apparatus is a UPF network element or a chip or a chip system used in the UPF network element. The communication unit 102 is configured to support the communication apparatus in performing step S403 in the foregoing embodiments. The processing unit 101 is configured to support the communication apparatus in performing S404 in the foregoing embodiments.

In still another example, the communication apparatus is an SMF network element or a chip or a chip system used in the SMF network element. The communication unit 102 is configured to support the communication apparatus in performing S401, S403, S404, and S405 in the foregoing embodiments. The processing unit 101 is configured to support the communication apparatus in performing S402 in the foregoing embodiments.

In a possible embodiment, the communication unit 102 is further configured to support the communication apparatus in performing S4021 and S4022 in the foregoing embodiments.

In yet another example, the communication apparatus is a PCF network element or a chip or a chip system used in the PCF network element. The communication unit 102 is configured to support the communication apparatus in performing S4001, S4021, and S4022 in the foregoing embodiments. The processing unit 101 is configured to support the communication apparatus in performing S4002 in the foregoing embodiments.

In a possible embodiment, the communication apparatus may further include a storage unit 103. The processing unit 101, the communication unit 102, and the storage unit 103 are connected through a communication bus.

The storage unit 103 may include one or more memories. The memory may be a component configured to store a program or data in one or more devices or circuits.

The storage unit 103 may exist independently, and is connected to the processing unit 101 of the communication apparatus through the communication bus. The storage unit 103 may alternatively be integrated with the processing unit.

The communication apparatus may be used in a communication device, a circuit, a hardware component, or a chip.

For example, the communication apparatus may be the chip or the chip system used in the SMF network element, the UPF network element, the PCF network element, or the terminal device in embodiments of this disclosure. In this case, the communication unit 102 may be an input or output interface, a pin, a circuit, or the like. For example, the storage unit 103 may store computer-executable instructions of the method on an SMF network element side, a UPF network element side, a PCF network element side, or a terminal device side, so that the processing unit 101 performs the method on the SMF network element side, the UPF network element side, the PCF network element side, or the terminal device side in the foregoing embodiments. The storage unit 103 may be a register, a cache, a RAM, or the like. The storage unit 103 may be integrated with the processing unit 101. The storage unit 103 may be a ROM or another type of static storage device that can store static information and instructions, and the storage unit 103 may be independent of the processing unit 101.

An embodiment of this disclosure provides a communication apparatus. The communication apparatus includes one or more modules configured to implement the method in S401 to S406. The one or more modules may correspond to the steps in the method in S401 to S406. Further, for each step in a method performed by the SMF network element in embodiments of this disclosure, the SMF network element includes a unit or module for performing each step in the method. For each step in a method performed by the UPF network element, the UPF network element includes a unit or module for performing each step in the method. For each step in a method performed by the PCF network element, the PCF network element includes a unit or module for performing each step in the method. For each step in a method performed by the terminal device, the terminal device includes a unit or module for performing each step in the method. For example, a module that controls or processes an action of the communication apparatus may be referred to as a processing module. A module that performs a step of processing a message or data on the communication apparatus side may be referred to as a communication module.

Figure 9:
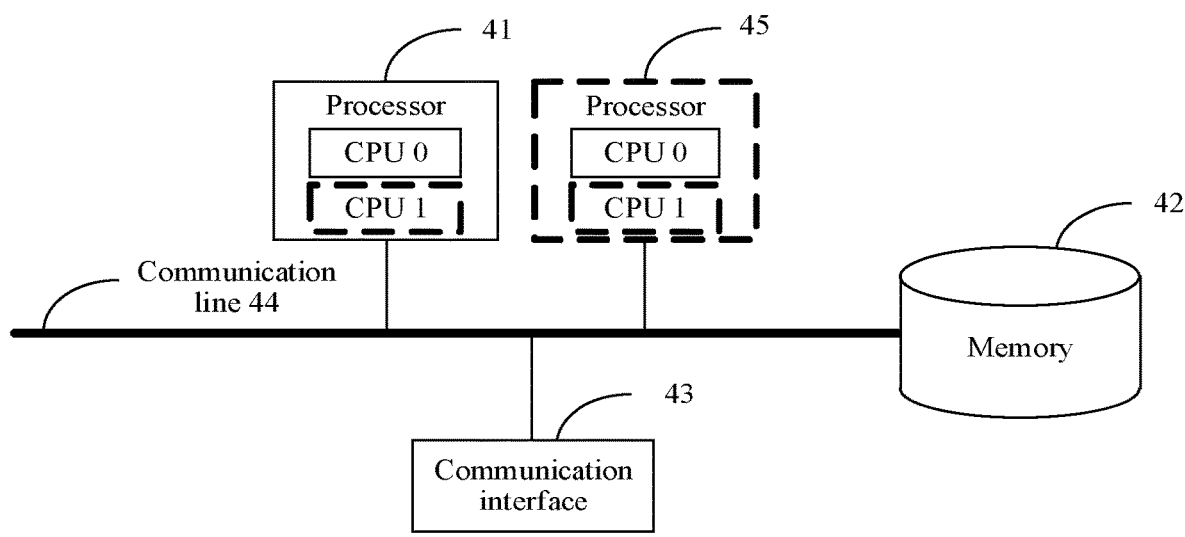
FIG. 9 is a schematic diagram of a structure of a communication device according to an embodiment of this disclosure.

FIG. 9 is a schematic diagram of a hardware structure of a communication device according to an embodiment of this disclosure. For hardware structures of the SMF network element, the UPF network element, and the PCF network element in embodiments of this disclosure, refer to the schematic diagram of the hardware structure of the communication device shown in FIG. 9. The communication device includes a processor 41, a communication line 44, and at least one communication interface (a communication interface 43 is used as an example in FIG. 9 for description).

The processor 41 may be a general-purpose central processing unit (CPU), a microprocessor, an application-specific integrated circuit (ASIC), or one or more integrated circuits configured to control program execution of the solutions of this disclosure.

The communication line 44 may include a path for transferring information between the foregoing components.

The communication interface 43 uses any apparatus such as a transceiver, and is configured to communicate with another device or a communication network such as an ethernet, a RAN, or a WLAN.

Possibly, the communication device may further include a memory 42.

The memory 42 may be a ROM or another type of static storage device that can store static information and instructions, a RAM or another type of dynamic storage device that can store information and instructions, or may be an electrically erasable programmable ROM (EEPROM), a compact disc (CD) ROM (CD-ROM) or another compact disc storage, an optical disc storage (including compact optical disc, a laser disc, an optical disc, a DIGITAL VERSATILE DISC (DVD), a BLU-RAY disc, or the like), a magnetic disk storage medium or another magnetic storage device, or any other medium that can be used to carry or store expected program code in a form of instructions or a data structure and that can be accessed by a computer. However, the memory 42 is not limited thereto. The memory may exist independently, and is connected to the processor through the communication line 44. The memory may alternatively be integrated with the processor.

The memory 42 is configured to store computer-executable instructions for executing the solutions of this disclosure, and the processor 41 controls the execution. The processor 41 is configured to execute the computer-executable instructions stored in the memory 42, to implement a policy control method provided in the following embodiments of this disclosure.

Possibly, the computer-executable instructions in this embodiment of this disclosure may also be referred to as application program code. This is not limited in this embodiment of this disclosure.

During specific implementation, in an embodiment, the processor 41 may include one or more CPUs, for example, a CPU 0 and a CPU 1 in FIG. 9.

During specific implementation, in an embodiment, the communication device may include a plurality of processors, such as the processor 41 and a processor 45 in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

In an example, the communication apparatus is an SMF network element or a chip used in the SMF network element. The communication interface is configured to support the communication apparatus in performing S401, S403, and S405 in the foregoing embodiments. The processor 41 or the processor 45 is configured to support the communication apparatus in performing S402 in the foregoing embodiments.

In another example, the communication apparatus may be a UPF network element or a chip or a chip system used in the UPF network element. The communication interface is configured to support the communication apparatus in performing S403 in the foregoing embodiments. The processor 41 or the processor 45 is configured to support the communication apparatus in performing step S404 in the foregoing embodiments.

In still another example, the communication apparatus may be a PCF network element or a chip or a chip system used in the PCF network element. The communication interface is configured to support the communication apparatus in performing S4001, S4021, and S4022 in the foregoing embodiments. The processor 41 or the processor 45 is configured to support the communication apparatus in performing S4002 in the foregoing embodiments.

Figure 10:
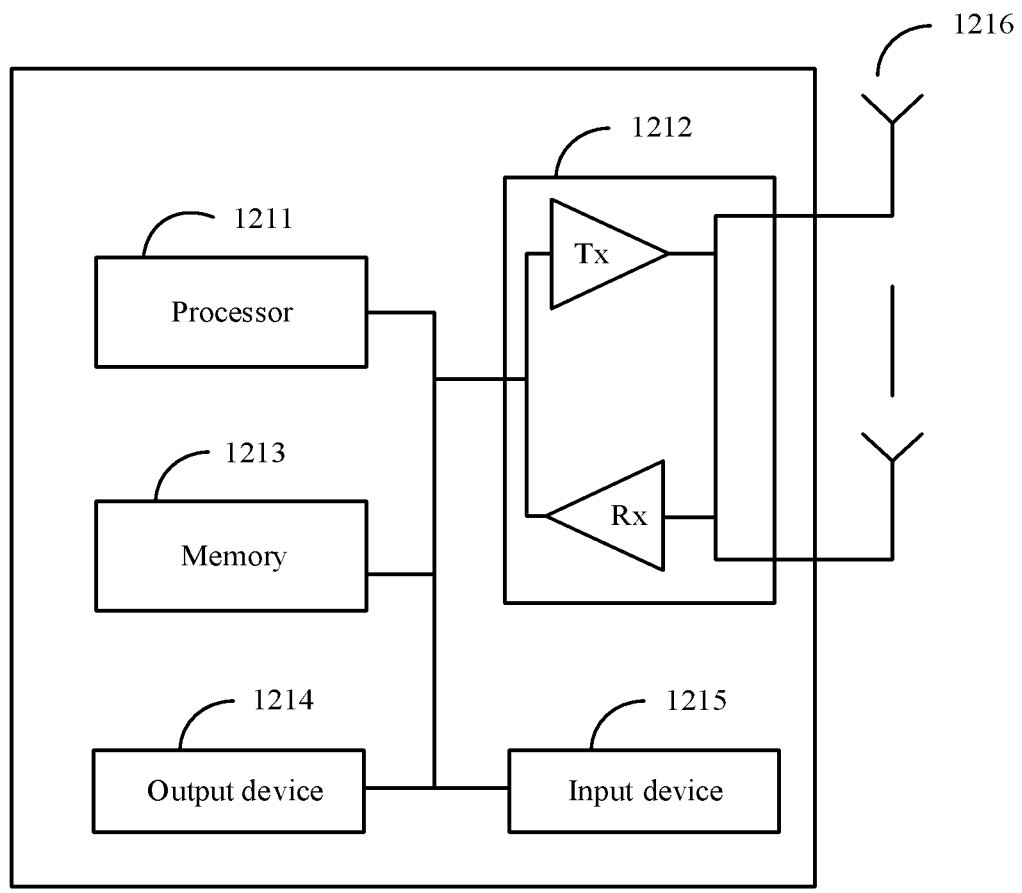
FIG. 10 is a schematic diagram of a structure of a terminal device according to an embodiment of this disclosure.

FIG. 10 is a schematic diagram of a structure of a terminal device (a terminal) according to an embodiment of this disclosure.

The terminal includes at least one processor 1211 and at least one transceiver 1212. In a possible example, the terminal may further include at least one memory 1213, an output device 1214, an input device 1215, and one or more antennas 1216. The processor 1211, the memory 1213, and the transceiver 1212 are connected to each other. The antenna 1216 is connected to the transceiver 1212, and the output device 1214 and the input device 1215 are connected to the processor 1211.

A memory in this embodiment of this disclosure, such as the memory 1213 may include at least one of the following types: a ROM or another type of static storage device that can store static information and instructions, a RAM or another type of dynamic storage device that can store information and instructions, or may be an EEPROM. In some scenarios, the memory may alternatively be a CD-ROM or another compact disc storage, an optical disc storage (including a compact optical disc, a laser disc, an optical disc, a DVD, a BLU-RAY disc, or the like), a magnetic disk storage medium or another magnetic storage device, or any other medium that can be used to carry or store expected program code in a form of instructions or a data structure and that can be accessed by a computer. However, the memory is not limited thereto.

The memory 1213 may exist independently, and is connected to the processor 1211. In another example, the memory 1213 may be integrated with the processor 1211, for example, be integrated into a chip. The memory 1213 can store program code for executing the technical solutions in embodiments of this disclosure, and the processor 1211 controls the execution. Various types of executed computer program code may also be considered as drivers of the processor 1211. For example, the processor 1211 is configured to execute the computer program code stored in the memory 1213, to implement the technical solutions in embodiments of this disclosure.

The transceiver 1212 may be configured to support receiving or sending of a radio frequency signal between terminals or between a terminal and an access device, and the transceiver 1212 may be connected to the antenna 1216. The transceiver 1212 includes a transmitter Tx and a receiver Rx. Further, the one or more antennas 1216 may receive a radio frequency signal. The receiver Rx of the transceiver 1212 is configured to receive the radio frequency signal from the antenna, convert the radio frequency signal into a digital baseband signal or a digital intermediate frequency signal, and provide the digital baseband signal or the digital intermediate frequency signal for the processor 1211, so that the processor 1211 further processes the digital baseband signal or the digital intermediate frequency signal, for example, performs demodulation processing and decoding processing. In addition, the transmitter Tx of the transceiver 1212 is further configured to receive a modulated digital baseband signal or a modulated digital intermediate frequency signal from the processor 1211, convert the modulated digital baseband signal or the modulated digital intermediate frequency signal into a radio frequency signal, and send the radio frequency signal through the one or more antennas 1216. Further, the receiver Rx may selectively perform one-level or multi-level down-conversion mixing and analog-to-digital conversion on the radio frequency signal to obtain the digital baseband signal or the digital intermediate frequency signal. A sequence of the down-conversion mixing and the analog-to-digital conversion may be adjusted. The transmitter Tx may selectively perform one-level or multi-level up-conversion mixing and digital-to-analog conversion on the modulated digital baseband signal or the modulated digital intermediate frequency signal, to obtain the radio frequency signal. A sequence of the up-conversion mixing and the digital-to-analog conversion may be adjusted. The digital baseband signal and the digital intermediate frequency signal may be collectively referred to as digital signals.

The processor 1211 may be a baseband processor, or may be a CPU. The baseband processor and the CPU may be integrated or separated.

The processor 1211 may be configured to implement various functions for the terminal, for example configured to process a communication protocol and communication data, or configured to control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid-crystal display (LCD), a light-emitting diode (LED) display device, a cathode-ray tube (CRT) display device, a projector, or the like. The input device 1215 communicates with the processor 1211, and may receive an input of a user in a plurality of manners. For example, the input device 1215 may be a mouse, a keyboard, a touchscreen device, or a sensing device.

Further, the at least one processor 1211 is configured to perform S406. The at least one transceiver 1212 is configured to perform S401 and S405.

Figure 11:
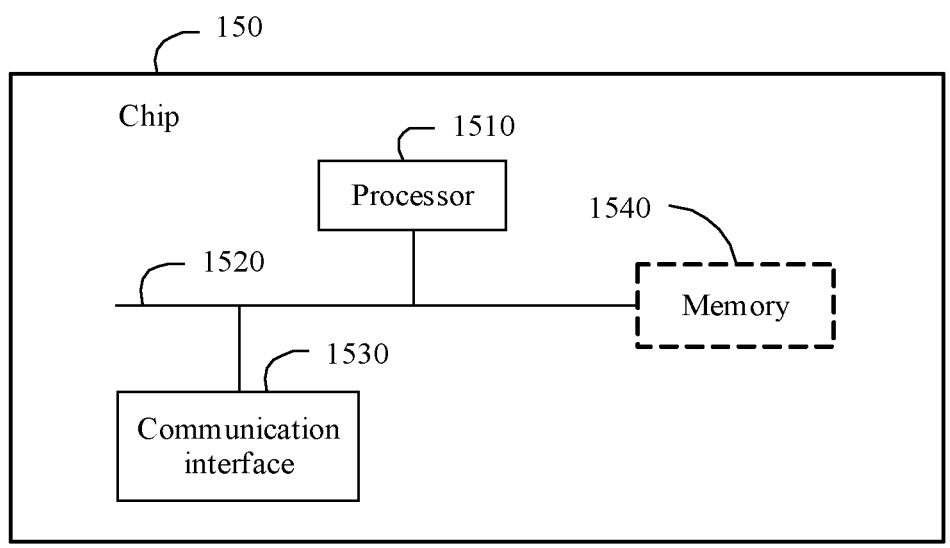
FIG. 11 is a schematic diagram of a structure of a chip according to an embodiment of this disclosure.

FIG. 11 is a schematic diagram of a structure of a chip 150 according to an embodiment of the present disclosure. The chip 150 includes one or more (including two) processors 1510 and a communication interface 1530.

In a possible embodiment, the chip 150 shown in FIG. 11 further includes a memory 1540. The memory 1540 may include a ROM and a RAM, and provide operation instructions and data for the processor 1510. A part of the memory 1540 may further include a non-volatile RAM (NVRAM).

In some implementations, the memory 1540 stores the following elements: an executable module or a data structure, a subset thereof, or an extended set thereof.

In this embodiment of the present disclosure, a corresponding operation is performed by invoking the operation instructions stored in the memory 1540 (where the operation instructions may be stored in an operating system).

In a possible implementation, a structure of a chip used in the SMF network element, a structure of a chip used in the UPF network element, a structure of a chip used in the PCF network element, and a structure of a chip used in the terminal device are similar, and different apparatuses may use different chips to implement respective functions.

The processor 1510 controls an operation of the SMF network element, the UPF network element, the PCF network element, or the terminal device, and the processor 1510 may also be referred to as a CPU. The memory 1540 may include a ROM and a RAM, and provide instructions and data for the processor 1510. A part of the memory 1540 may further include an NVRAM. For example, in an application, the processor 1510, the communication interface 1530, and the memory 1540 are coupled together through a bus system 1520. The bus system 1520 may further include a power bus, a control bus, a status signal bus, and the like in addition to a data bus. However, for clear description, various buses are marked as the bus system 1520 in FIG. 11.

The foregoing communication unit may be an interface circuit or a communication interface of the apparatus, and is configured to receive a signal from another apparatus. For example, when the apparatus is implemented as a chip, the communication unit is an interface circuit or a communication interface that is of the chip and that is configured to receive a signal from or send a signal to another chip or apparatus.

The methods disclosed in the foregoing embodiments of the present disclosure may be applied to the processor 1510, or implemented by the processor 1510. The processor 1510 may be an integrated circuit chip, and has a signal processing capability. In an implementation process, the steps in the foregoing methods may be implemented by using a hardware integrated logical circuit in the processor 1510, or by using instructions in a form of software. The processor 1510 may be a general-purpose processor, a digital signal processor (DSP), an ASIC, a field-programmable gate array (FPGA) or another programmable logic device, a discrete gate or transistor logic device, or a discrete hardware component. The processor 1510 may implement or perform the methods, the steps, and logical block diagrams that are disclosed in embodiments of the present disclosure. The general-purpose processor may be a microprocessor, or the processor may be any conventional processor or the like. Steps of the methods disclosed with reference to embodiments of the present disclosure may be directly executed and accomplished by a hardware decoding processor, or may be executed and accomplished by a combination of hardware and software modules in the decoding processor. The software module may be located in a mature storage medium in the art, such as a RAM, a flash memory, a ROM, a programmable ROM (PROM), an EEPROM, or a register. The storage medium is located in the memory 1540, and the processor 1510 reads information in the memory 1540 and completes the steps of the foregoing methods in combination with hardware of the processor 1510.

In a possible implementation, the communication interface 1530 is configured to perform receiving and sending steps of the SMF network element, the UPF network element, the PCF network element, or the terminal device in the embodiments shown in FIG. 4 to FIG. 7. The processor 1510 is configured to perform processing steps of the SMF network element, the UPF network element, the PCF network element, or the terminal device in the embodiments shown in FIG. 4 to FIG. 7.

In the foregoing embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or a part of the procedures or functions according to embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

Embodiments of this disclosure further provide a computer-readable storage medium. The methods described in the foregoing embodiments may be all or partially implemented by software, hardware, firmware, or any combination thereof. If the methods are implemented in the software, functions may be used as one or more instructions or code and stored in the computer-readable medium or transmitted on the computer-readable medium. The computer-readable medium may include a computer storage medium and a communication medium, and may further include any medium that can transfer a computer program from one place to another. The storage medium may be any target medium that can be accessed by a computer.

In a possible design, the computer-readable medium may include a RAM, a ROM, an EEPROM, a CD-ROM, or another optical disc storage, a magnetic disk storage or another magnetic storage device, or any other medium that is used to carry or store required program code in a form of instructions or a data structure and that may be accessed by the computer. In addition, any connection is appropriately referred to as a computer-readable medium. For example, if a coaxial cable, an optical fiber cable, a twisted pair, a DSL, or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a CD, a laser disc, an optical disc, a DVD, a floppy disk, and a BLU-RAY disc. The magnetic disks usually magnetically reproduce data, and the optical discs optically reproduce data by using laser light. The foregoing combinations should also be included within the scope of the computer-readable medium.

Embodiments of this disclosure further provide a computer program product. The methods described in the foregoing embodiments may be all or partially implemented by software, hardware, firmware, or any combination thereof. If the methods are implemented in the software, the methods may be all or partially implemented in a form of the computer program product. The computer program product includes one or more computer instructions. When the foregoing computer program instructions are loaded and executed on a computer, all or a part of the procedures or functions described according to the foregoing method embodiments are generated. The computer may be a general-purpose computer, a dedicated computer, a computer network, a base station, a terminal, or another programmable apparatus.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made on the basis of the technical solutions of the present disclosure shall fall within the protection scope of the present disclosure.

It should be noted that the network elements in embodiments of this disclosure may alternatively use other definitions or names during specific application. For example, the SMF network element may be referred to as a first core network element, the UPF network element may be referred to as a second core network element, the PCF network element may be referred to as a third core network element, the AMF network element may be referred to as a fourth core network element. Alternatively, the foregoing network elements may also be collectively referred to as core network elements. Alternatively, other names may be defined for the foregoing network elements based on actual functions. This is not limited in embodiments of this disclosure.

What is claimed is:

1. A communication method implemented by a first device, wherein the communication method comprises:
   receiving, from a session management network element, first indication information and a service flow identifier of a protocol data unit (PDU) session, wherein the first indication information instructs the first device to select a transmission link for a service flow of the PDU session; and
   selecting, based on the service flow identifier and the first indication information, the transmission link.

2. The communication method of claim 1, further comprising:
   identifying, based on the service flow identifier, the service flow; and
   selecting, based on the first indication information, one or more transmission links for the service flow corresponding to the service flow identifier.

3. The communication method of claim 2, further comprising further selecting, based on at least one of a user preference, an application preference, or a local policy, the one or more transmission links.

4. The communication method of claim 1, wherein the first indication information indicates a steering mode, and wherein the steering mode comprises:
   a first steering mode in which the first device autonomously selects a first transmission link for the service flow;
   a second steering mode in which the first device selects, for the service flow, a second transmission link that meets a transmission quality of service (QoS) requirement of the service flow;
   a third steering mode in which the first device selects, for the service flow, a third transmission link that meets a transmission bandwidth requirement of the service flow;
   a redundant transmission mode in which the first device selects first two links for the service flow to simultaneously transmit the service flow; or
   a load-balancing steering mode in which the first device determines split percentages of second two links for the service flow.

5. The communication method of claim 1, further comprising receiving, from the session management network element, a steering mode, wherein the steering mode comprises one of the following modes:
   a smallest delay steering mode;
   a load-balancing steering mode;
   a priority-based steering mode; or
   an active-standby steering mode, and
   wherein the first indication information comprises steering indication information instructing the first device to either:
      select one or more other transmission links for the service flow when a link selected based on the steering mode does not meet a transmission requirement of the service flow of the PDU session; or
      select one or more transmission links for the service flow based on the steering mode and the steering indication information.

6. The communication method of claim 5, wherein the steering mode is the load-balancing steering mode, wherein the steering indication information comprises a split percentage of at least one link instructing the first device to set the split percentage of the at least one link.

7. The communication method of claim 1, wherein the service flow identifier comprises one or more of:
   a PDU session identifier or an N4 session identifier;
   service flow description information;
   an application identifier;
   a quality of service (QoS) flow identifier;
   a service type identifier;
   an application type identifier; or
   a terminal external identifier.

8. The communication method of claim 1, wherein the first device is a terminal device, and wherein the communication method further comprises sending, to the session management network element, a message requesting to establish or update a second PDU session.

9. The communication method of claim 1, wherein the first device is a user plane network element.

10. A first device comprising:
a memory configured to store instructions; and
a processor coupled to the memory and configured to execute the instructions to cause the first device to:
receive, from a session management network element, first indication information and a service flow identifier of a protocol data unit (PDU) session, wherein the first indication information instructs the first device to select a transmission link for a service flow of the PDU session; and
select, based on the service flow identifier and the first indication information, the transmission link.

11. A communication system comprising:
a session management network element configured to send first indication information and a service flow identifier of a protocol data unit (PDU) session, wherein the first indication information instructs to select a transmission link for a service flow of the PDU session; and
a first device coupled to the session management network element and configured to:
receive, from the session management network element, the first indication information and the service flow identifier; and
select, based on the service flow identifier and the first indication information, the transmission link.

12. The communication system of claim 11, further comprising:
identifying, based on the service flow identifier, the service flow; and
selecting, based on the first indication information, one or more transmission links for the service flow corresponding to the service flow identifier.

13. The communication system of claim 12, wherein the first device is further configured to further select, based on at least one of a user preference, an application preference, or a local policy, the one or more transmission links.

14. The communication system of claim 12, wherein the first device is further configured to further select, based on at least two of a link status, a transmission condition threshold, a service type, or an application type, the one or more transmission links.

15. The communication system of claim 12, wherein the first device is further configured to further select, based on a user preference, an application preference, a local policy, a link status, and a transmission condition threshold, the one or more transmission links.

16. The communication system of claim 12, wherein the first device is further configured to further select, based on a user preference or an application preference, or a local policy, and a link status or a transmission condition threshold, the one or more transmission links.

17. The communication system of claim 11, wherein the first indication information indicates a steering mode, and wherein the steering mode comprises:
a first steering mode in which the first device autonomously selects a first transmission link for the service flow;
a second steering mode in which the first device selects, for the service flow, a second transmission link that meets a transmission quality of service (QoS) requirement of the service flow;
a third steering mode in which the first device selects, for the service flow, a third transmission link that meets a transmission bandwidth requirement of the service flow;
a redundant transmission mode in which the first device selects first two links for the service flow to simultaneously transmit the service flow; or
a load-balancing steering mode in which the first device determines split percentages of second two links for the service flow.

18. The communication method of claim 2, further comprising further selecting, based on at least two of a link status, a transmission condition threshold, a service type, or an application type, the one or more transmission links.

19. The communication method of claim 2, further comprising further selecting, based on a user preference, an application preference, a local policy, a link status, and a transmission condition threshold, the one or more transmission links.

20. The communication method of claim 2, further comprising further selecting, based on a user preference or an application preference, or a local policy, and a link status or a transmission condition threshold, the one or more transmission links.

* * * * *